(12) United States Patent
Parvulescu et al.

(10) Patent No.: US 10,029,244 B2
(45) Date of Patent: *Jul. 24, 2018

(54) PROCESS FOR PREPARING A TITANIUM-CONTAINING ZEOLITIC MATERIAL HAVING AN MWW FRAMEWORK STRUCTURE

(71) Applicant: BASF SE, Ludwigshafen (DE)

(72) Inventors: Andrei-Nicolae Parvulescu, Heidelberg (DE); Ulrich Mueller, Neustadt (DE); Hans-Juergen Luetzel, Boehl-Iggelheim (DE); Georg Uhl, Kaiserslautern (DE); Robert Bayer, Sinsheim (DE); Regina Vogelsang, Ludwigshafen (DE); Joaquim Henrique Teles, Waldsee (DE); Dominic Riedel, Mannheim (DE); Daniel Urbanczyk, Griesheim (DE); Ulrike Wegerle, Worms (DE)

(73) Assignee: BASF SE, Ludwigshafen (DE)

( * ) Notice: Subject to any disclaimer, the term of this patent is extended or adjusted under 35 U.S.C. 154(b) by 297 days.

This patent is subject to a terminal disclaimer.

(21) Appl. No.: 14/764,354

(22) PCT Filed: Feb. 5, 2014

(86) PCT No.: PCT/EP2014/052205
§ 371 (c)(1),
(2) Date: Jul. 29, 2015

(87) PCT Pub. No.: WO2014/122152
PCT Pub. Date: Aug. 14, 2014

(65) Prior Publication Data
US 2015/0368115 A1   Dec. 24, 2015

(30) Foreign Application Priority Data
Feb. 5, 2013 (EP) .................................. 13154021

(51) Int. Cl.
*C01B 39/48* (2006.01)
*B01J 29/89* (2006.01)
*B01J 37/00* (2006.01)
*B01J 29/70* (2006.01)
*C01B 39/08* (2006.01)

(52) U.S. Cl.
CPC ....... *B01J 37/0045* (2013.01); *B01J 29/7038* (2013.01); *B01J 29/89* (2013.01); *C01B 39/085* (2013.01)

(58) Field of Classification Search
CPC ......... C01B 39/04; C01B 39/10; C01B 39/54; C01B 39/085; B01J 29/7015; B01J 29/763; B01J 29/85; B01J 29/7038; B01J 29/89; B01J 37/0045

See application file for complete search history.

(56) References Cited

U.S. PATENT DOCUMENTS

| | | |
|---|---|---|
| 2004/0054199 A1 | 3/2004 | Müller et al. |
| 2005/0085646 A1 | 4/2005 | Müller et al. |
| 2005/0169836 A1 | 8/2005 | Jones et al. |
| 2005/0209091 A1 | 9/2005 | Tatsumi et al. |
| 2006/0105903 A1 | 5/2006 | Tatsumi et al. |
| 2006/0167286 A1 | 7/2006 | Müller et al. |
| 2011/0130579 A1 | 6/2011 | Müller et al. |
| 2013/0090234 A1 | 4/2013 | Yilmaz et al. |

FOREIGN PATENT DOCUMENTS

| | | |
|---|---|---|
| CN | 1639064 A | 7/2005 |
| CN | 102740968 A | 10/2012 |
| EP | 1 485 321 | 12/2004 |
| JP | 2004-292171 A | 10/2004 |
| RU | 2 332 409 C2 | 8/2008 |
| RU | 2 353 580 C2 | 4/2009 |
| WO | WO 02/28774 A2 | 4/2002 |
| WO | WO 02/057181 A2 | 7/2002 |
| WO | WO 03/074421 A1 | 9/2003 |

(Continued)

OTHER PUBLICATIONS

Wu et al, "Hydrothermal Synthesis of a Novel Titanosilicate with MWW Topology", Chemistry Letters, pp. 774-775, (2000).*
International Search Report dated Mar. 13, 2014 in PCT/EP2014/052205.
International Preliminary Report on Patentability and Written Opinion dated Aug. 20, 2015 in PCT/EP2014/052205.
Peng Wu et al., "Preparation of B-free Ti-MWW through reversible structural conversion", Chemical Communications, XP-002533316, Apr. 11, 2002, pp. 1026-1027.
Office Action dated Sep. 5, 2016 in Chinese Patent Application No. 2014800202196 (submitting English translation only).
Manuel Moliner, et al., "Synthesis of Expanded Titanosilicate MWW-Related Materials from a Pure Silica Precursor" Chemistry of Materials, vol. 24, 2012, pp. 4371-4375.
Zhu Hong, et al., "Study of Effect of pH Value on the Structure of Mesoporous Silica" New Progress on Material Science and Engineering 2004, edited by Chinese Materials Research Society, Metallurgical Industry Press, Jun. 2005, pp. 339-344 and cover page (with English Abstract).

*Primary Examiner* — David M Brunsman
(74) *Attorney, Agent, or Firm* — Oblon, McClelland, Maier & Neustadt, L.L.P.

(57) ABSTRACT

A process for the preparation of a titanium-containing zeolitic material having an MWW framework structure, the process comprising (i) providing a zeolitic material having an MWW framework structure comprising SiO2 and B2O3, (ii) incorporating titanium into the zeolitic material provided in (i) comprising (ii.I) preparing an aqueous synthesis mixture containing the zeolitic material provided in (i), an MWW template compound and a titanium source, (ii.2) hydrothermally synthesizing a titanium-containing zeolitic material having an MWW framework structure from the aqueous synthesis mixture prepared in (ii.1), obtaining a mother liquor comprising the titanium-containing zeolitic material having an MWW framework structure; (iii) spray-drying the mother liquor obtained from (ii.2) comprising the titanium-containing zeolitic material having an MWW framework structure.

28 Claims, 6 Drawing Sheets

(56) References Cited

FOREIGN PATENT DOCUMENTS

Figure 1:
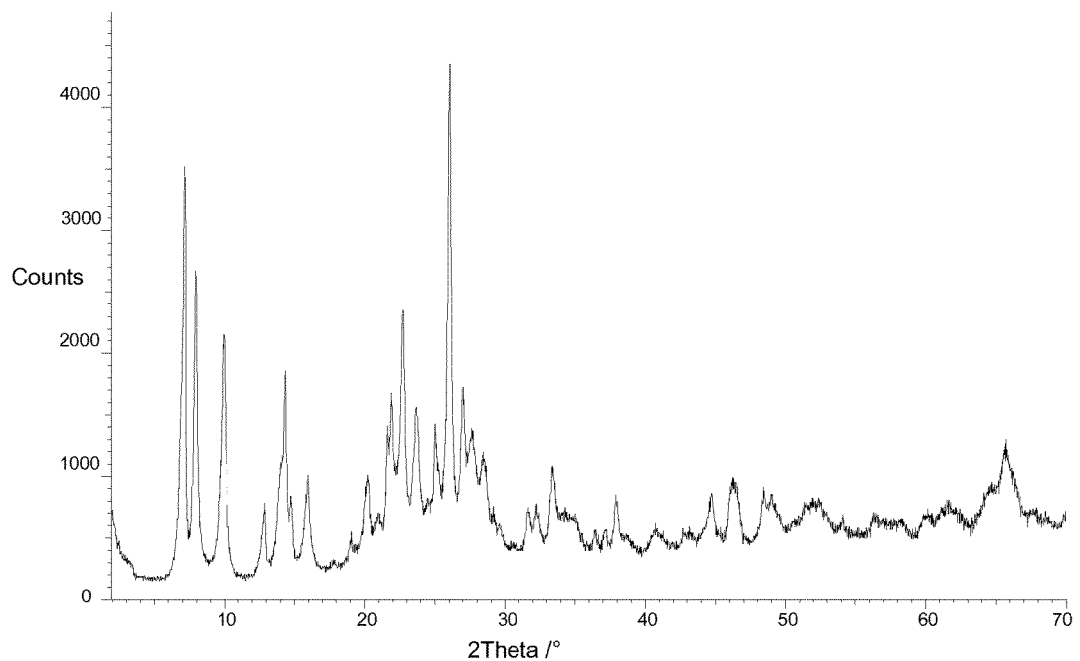

| WO | WO 03/074422 A1 | 9/2003 |
|---|---|---|
| WO | WO 2005/020991 A1 | 3/2005 |
| WO | WO 2011/064191 A1 | 6/2011 |
| WO | WO 2011/157839 A1 | 12/2011 |
| WO | WO 2012/018408 A2 | 2/2012 |
| WO | WO 2012/070067 A2 | 5/2012 |
| WO | WO2013117536 A2 * | 8/2013 |

* cited by examiner

PROCESS FOR PREPARING A TITANIUM-CONTAINING ZEOLITIC MATERIAL HAVING AN MWW FRAMEWORK STRUCTURE

The present invention relates to a process for preparing a titanium-containing zeolitic material having an MWW framework structure and a novel titanium-containing zeolitic material having an MWW framework structure. Further, the present invention relates to preferred uses of this novel titanium-containing zeolitic material having an MWW framework structure.

Zeolites are widely used in the chemical industry, for example as heterogenous catalysts for various chemical and petrochemical processes. Catalysts based on titanium-containing zeolitic materials such as zeolitic materials having an MWW framework structure are known to be efficient catalysts, for example for epoxidation reactions.

Such epoxidation reactions are usually performed in laboratory scale, in pilot plant scale, and in industrial scale. In particular as far as the pilot plant processes and the industrial scale processes are concerned where comparatively high amounts of titanium-containing zeolitic materials having an MWW framework structure are employed, it is generally desired to prepare the titanium-containing zeolitic materials having an MWW framework structure in an ecologically and economically advantageous manner.

A process for the preparation for a titanium-containing zeolitic material is described in EP 1 485 321 A1. According to this process, a boron containing zeolitic material having MWW framework structure is deboronated by an acid-treatment, followed by incorporation of titanium in the deboronated zeolitic material. According to this document, the obtained titanium-containing zeolitic material is separated from the respective suspension by filtration prior to a drying step.

Further, WO 02/28774 A2 describes a process for the preparation of a titanium-containing zeolitic material having an MWW framework structure. In the course of the preparation of the material, a filtration step is carried out to separate the titanium-containing zeolitic material having an MWW framework structure from its mother liquor.

In Chemistry of Materials 24 (2012), pages 4371-4374, a process for the preparation of a titanium-containing zeolitic material having an MWW framework structure is described. According to this process, a boron containing zeolitic material having MWW framework structure is deboronated by acid-treatment. After incorporation of titanium into the deboronated material, the titanium-containing zeolitic material is separated from its mother liquor by filtration. Further, a process for the preparation of a titanium-containing zeolitic material having an extended layered structure is described. According to this process, a boron free zeolitic material having an ITQ-1 framework structure is prepared followed by the hydrothermal incorporation of titanium, wherein after hydrothermal incorporation of titanium, the titanium-containing zeolitic material is separated from its mother liquor by filtration.

According to the prior art, the crystallization time of the titanium-containing zeolitic material is usually comparatively high. Further, separation of the zeolitic material via filtration usually increases the overall duration of the preparation process. Therefore, it was an object of the present invention to provide a process for the preparation of a titanium containing zeolitic material having MWW framework structure which is better suitable in particular for the industrial-scale preparation.

Surprisingly, it was found that employing a specific amount of template compound during the hydrothermal incorporation of titanium in a deboronated material having MWW framework structure allows to decrease the crystallization time and thus leads to an advantageous process. Yet further, it was found that this specific amount of template compound is comparatively low compared to the respective amount as described in the prior art. Therefore, the process according to the invention not only allows to decrease the crystallization time but also allows to decrease the relative amount of template compound, thus rendering the overall process even more advantageous. Further it was found that in order to obtain the titanium containing zeolitic material having MWW framework structure, it is not necessary to subject the mother liquor obtained according to the process of the present invention containing said material to filtration, and that is possible to subject said mother liquor to a direct spray-drying. Thus, a process is provided in which the separation of the titanium containing zeolitic material having MWW framework structure from its mother liquor and drying said material is combined in one single step, which combination of steps also renders the overall process more advantageous.

Yet further, it was found that according to a preferred process of providing a deboronated zeolitic material having MWW framework structure, the overall process can be designed even more advantageous if prior to the filtration of the deboronated zeolitic material having MWW framework structure, an pH adjustment of the suspension containing the zeolitic material having MWW framework structure is carried out, which acid treatment improves the filtration characteristics of the zeolitic material having MWW framework structure and thus renders the overall process even more advantageous.

Also surprisingly, it was found that the novel and advantageous process also results in a novel zeolitic material having MWW framework structure which, compared to known zeolitic materials having MWW framework structure, is characterized by different physical parameters and exhibits improved catalytic properties.

Therefore, the present invention relates to a process for preparing a titanium-containing zeolitic material having an MWW framework structure comprising (i) providing a zeolitic material having an MWW framework structure comprising $SiO_2$ and $B_2O_3$, wherein the molar ratio $B_2O_3:SiO_2$ is at most 0.02:1 and wherein at least 99 weight-% of the MWW framework structure consist of $B_2O_3$ and $SiO_2$;

(ii) incorporating titanium into the zeolitic material provided in (i) comprising
   (ii.1) preparing an aqueous synthesis mixture containing the zeolitic material provided in (i), an MWW template compound and a titanium source, wherein the molar ratio of the MWW template compound relative to Si, calculated as $SiO_2$ and contained in the zeolitic material provided in (i), is in the range of from 0.5:1 to 1.4:1;
   (ii.2) hydrothermally synthesizing a titanium-containing zeolitic material having an MWW framework structure from the aqueous synthesis mixture prepared in (ii.1), obtaining a mother liquor comprising the titanium-containing zeolitic material having an MWW framework structure;

(iii) spray-drying the mother liquor obtained from (ii.2) comprising the titanium-containing zeolitic material having an MWW framework structure.

Further, the present invention relates to a spray powder comprising a titanium-containing zeolitic material having an MWW framework structure, wherein at least 99 weight-% of the framework structure consist of titanium, silicon, and oxygen, and wherein at least 99 weight-% of the spray powder consist of the titanium-containing zeolitic material having an MWW framework structure, wherein the lattice parameter c of the titanium-containing zeolitic material having an MWW framework structure is (25.2±0.2) Angstrom, as determined via XRD, and wherein preferably, the UV/VIS spectrum of the titanium-containing zeolitic material having an MWW framework structure has a band with a maximum in the range of from 200 to 220 nm, and has no band with a maximum in the range of at least 250 nm.

SHORT DESCRIPTION OF THE FIGURES

FIG. 1 shows the X-ray diffraction pattern (copper K alpha radiation) of the spray powder obtained according to Example 1. On the x axis, the degree values (2 Theta) are shown, on the y axis, the intensity (Lin (Counts)). The measurement was performed on a D8 Advance series 2 diffractometer from Bruker AXS. The diffractometer was configured with an opening of the divergence aperture of 0.1° and a Lynxeye detector.

Figure 2:
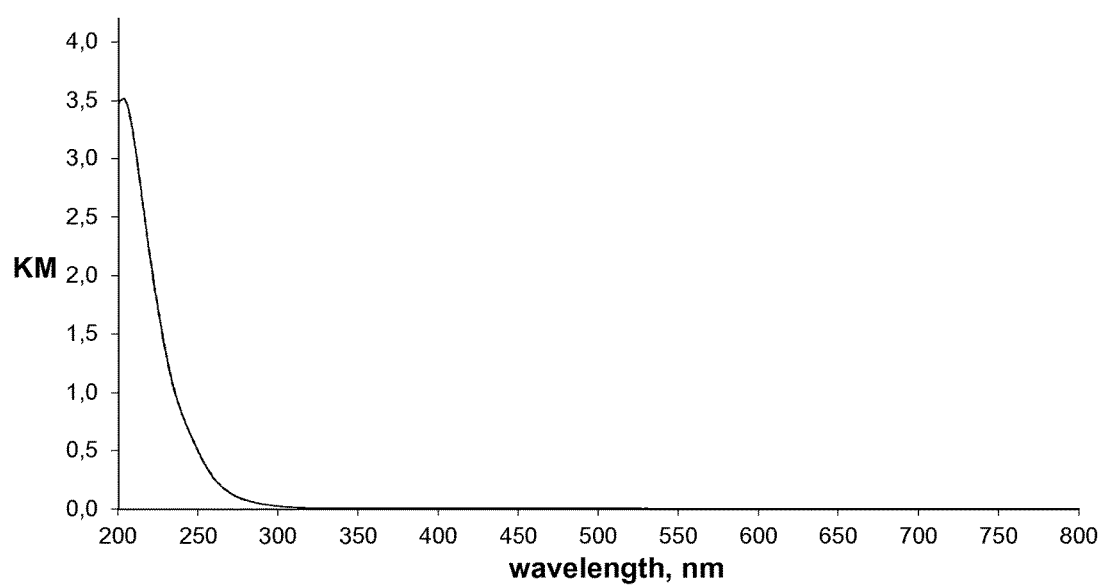

FIG. 2 shows the UV/VIS spectrum of the spray powder obtained according to Example 1. The measurement was performed on a Perkin Elmer Lambda 900 spectrophotometer with 150 mm integrating sphere. Spectralon white reflectance standards are used as reference. On the x axis, the wavelength values (nanometer) are shown.

Figure 3:
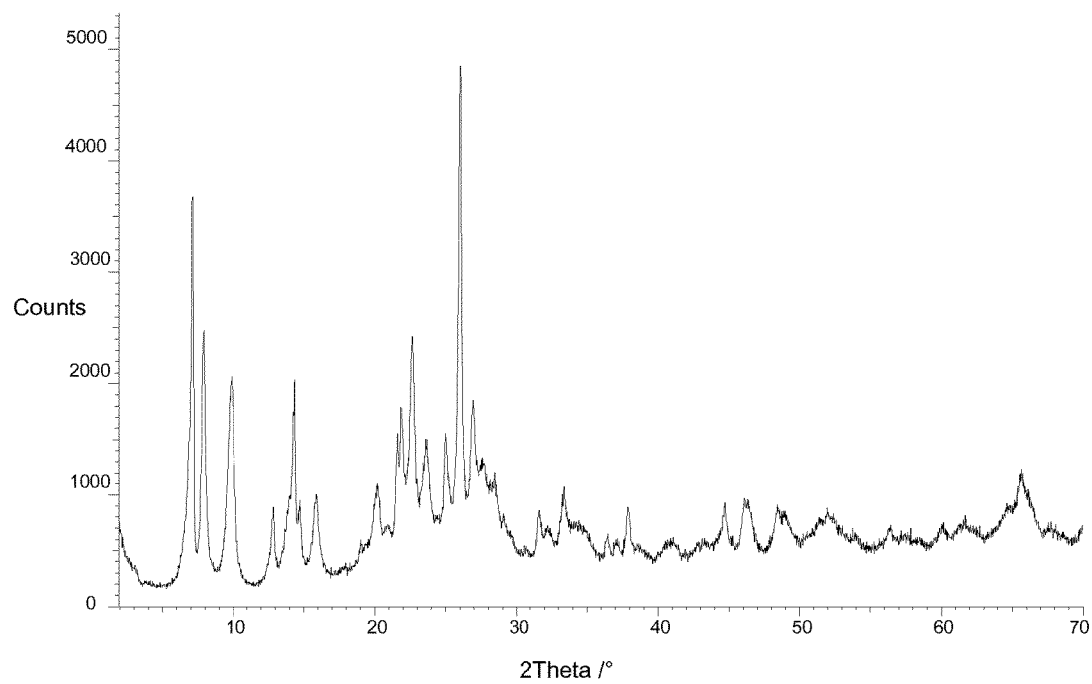

FIG. 3 shows the X-ray diffraction pattern (copper K alpha radiation) of the spray powder obtained according to Example 2. On the x axis, the degree values (2 Theta) are shown, on the y axis, the intensity (Lin (Counts)). The measurement was performed on a D8 Advance series 2 diffractometer from Bruker AXS. The diffractometer was configured with an opening of the divergence aperture of 0.1° and a Lynxeye detector.

Figure 4:
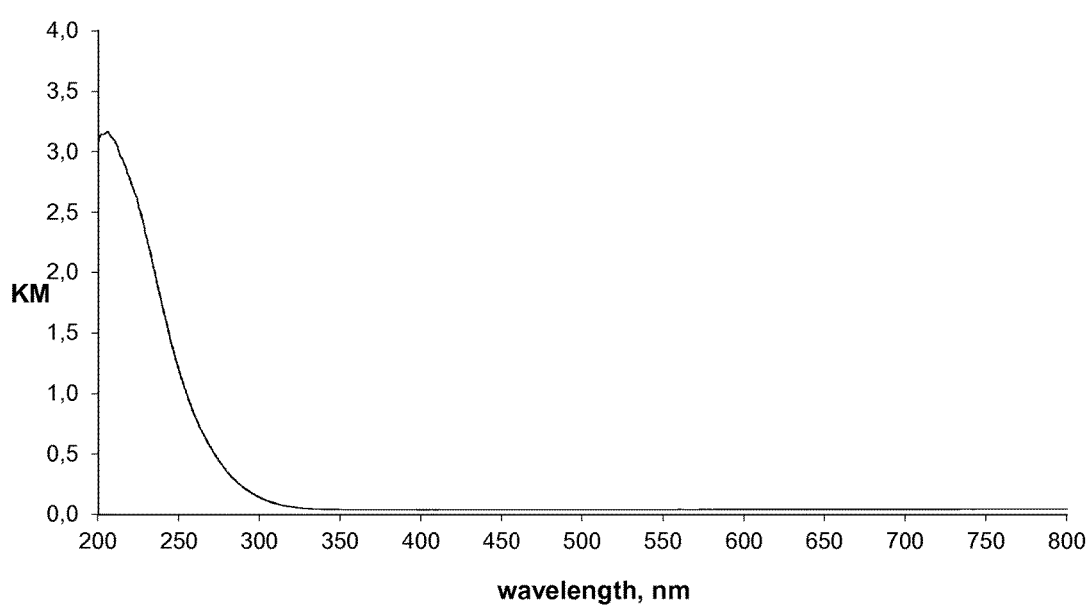

FIG. 4 shows the UV/VIS spectrum of the spray powder obtained according to Example 2. The measurement was performed on a Perkin Elmer Lambda 900 spectrophotometer with 150 mm integrating sphere. Spectralon white reflectance standards are used as reference. On the x axis, the wavelength values (nanometer) are shown.

Figure 5:
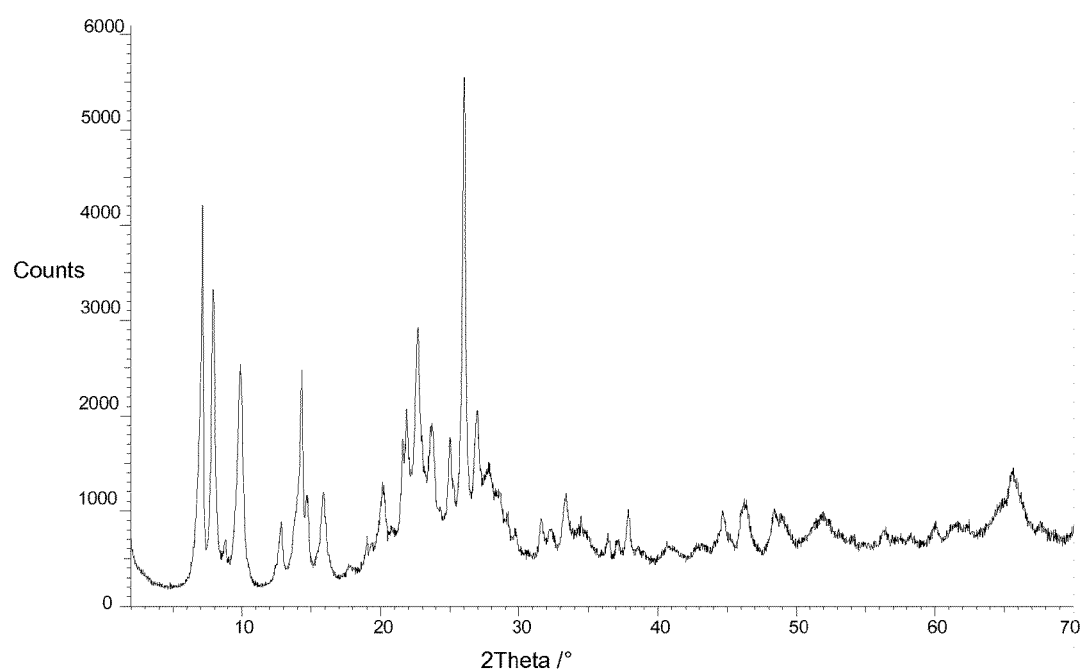

FIG. 5 shows the X-ray diffraction pattern (copper K alpha radiation) of the spray powder obtained according to Comparative Example 1. On the x axis, the degree values (2 Theta) are shown, on the y axis, the intensity (Lin (Counts)). The measurement was performed on a D8 Advance series 2 diffractometer from Bruker AXS. The diffractometer was configured with an opening of the divergence aperture of 0.1° and a Lynxeye detector.

Figure 6:
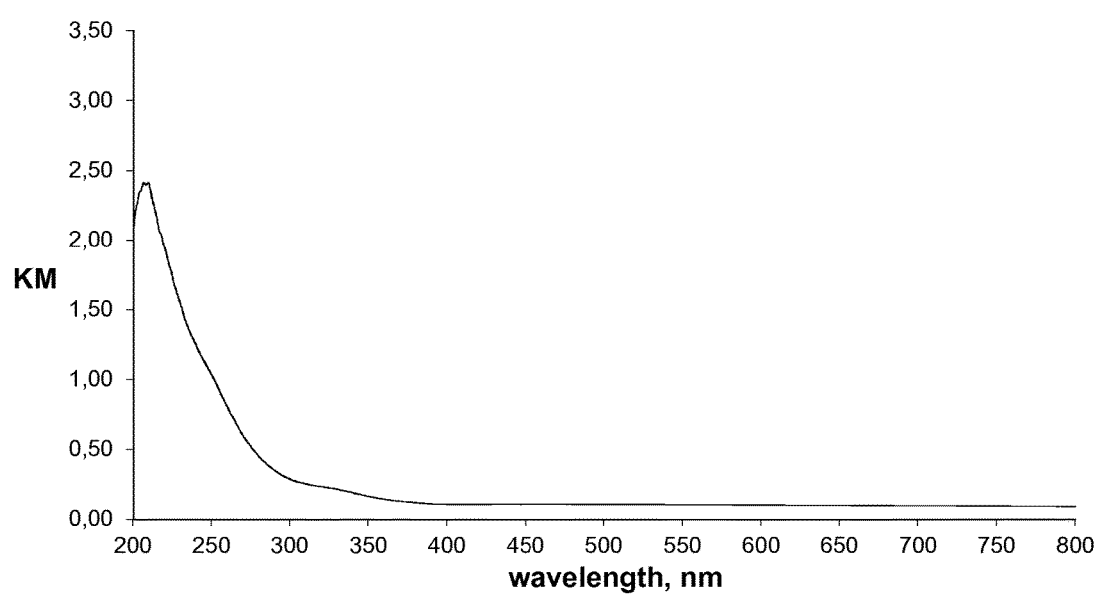

FIG. 6 shows the UV/VIS spectrum of the spray powder obtained according to Comparative Example 1. The measurement was performed on a Perkin Elmer Lambda 900 spectrophotometer with 150 mm integrating sphere. Spectralon white reflectance standards are used as reference. On the x axis, the wavelength values (nanometer) are shown.

STEP (i)

According to step (i) of the process of the invention, a zeolitic material is provided having an MWW framework structure comprising $SiO_2$ and $B_2O_3$, wherein the molar ratio $B_2O_3:SiO_2$ is at most 0.02:1 and wherein at least 99 weight-% of the MWW framework structure consist of $B_2O_3$ and $SiO_2$.

In general, there are no specific restrictions how this zeolitic material having an MWW framework structure is provided. For example, it may be conceivable to purchase a suitable, commercially available zeolitic material having an MWW framework structure. Further, for example, any conceivable process for synthesizing such a zeolitic material can be employed for providing the zeolitic material. Preferably, the zeolitic material is provided in (i) by a process including hydrothermally synthesizing a precursor of a boron-containing zeolitic material having an MWW framework structure which is most preferably free of aluminum or essentially free of aluminum, i.e. contains aluminum only in traces as impurities, starting from suitable sources of $SiO_2$ and $B_2O_3$ in the presence of a suitable template compound, also referred to herein as structure directing agent, followed by separation and calcination to obtain the boron-containing zeolitic material from its mother liquor, and subsequent deboronation of the boron-containing zeolitic material.

Preferably, the zeolitic material having an MWW framework structure is provided in (i) by a process comprising (a) hydrothermally synthesizing a B-MWW precursor comprising $SiO_2$ and $B_2O_3$ with a molar ratio $B_2O_3:SiO_2$ of greater than 0.02:1 from a synthesis mixture containing a silicon source, a boron source, and an MWW template compound, obtaining the B-MWW precursor in its mother liquor;

(b) separating the B-MWW precursor from its mother liquor, and calcining the separated B-MWW precursor, obtaining a B-MWW;

(c) deboronating the B-MWW obtained from (b) by treating the B-MWW with a liquid solvent system obtaining the zeolitic material having an MWW framework structure and a molar ratio $B_2O_3:SiO_2$ of at most 0.02:1, and at least partially separating the zeolitic material from the liquid solvent system.

As far as the silicon source used in (a) is concerned, no specific restrictions exist. Preferably, the silicon source is a fumed silica, a mixture of two or more fumed silica, a colloidal silica such as ammonia-stabilized colloidal silica, a mixture of two or more colloidal silica, or a mixture of at least one fumed silica and at least one colloidal silica. Preferably, the silicon source comprises a colloidal silica, more preferably an ammonia-stabilized colloidal silica. More preferably, the silicon source is a colloidal silica, more preferably an ammonia-stabilized colloidal silica.

As far as the boron source used in (a) is concerned, no specific restrictions exist. Preferably, the boron source is boric acid, a borate, in particular a water-soluble borate, a boron halide, boron oxide ($B_2O_3$), or a mixture of two or more thereof, with boric acid being especially preferred.

As far as the MWW template compound used in (a) is concerned, no specific restrictions exist provided that the B-MWW precursor is obtained. Preferably, the MWW template compound is selected from the group consisting of selected from the group consisting of piperidine, hexamethylene imine, N,N,N,N',N',N'-hexamethyl-1,5-pentanediammonium ion, 1,4-bis(N-methylpyrrolidinium)butane, octyltrimethylammonium hydroxide, heptyltrimethylammonium hydroxide, hexyltrimethylammonium hydroxide, N,N,N-trimethyl-1-adamantylammonium hydroxide, and a mixture of two or more thereof. More preferably, the MWW template compound is piperidine.

Thus, preferably, in (a), the silicon source comprises ammonia stabilized colloidal silica, the boron source comprises boric acid, and the MWW template compound is selected from the group consisting of piperidine, hexamethylene imine, N,N,N,N',N',N'-hexamethyl-1,5-pentanediammonium ion, 1,4-bis(N-methylpyrrolidinium)butane, octyltrimethylammonium hydroxide, heptyltrimethylammonium hydroxide, hexyltrimethylammonium hydroxide and a mixture of two or more thereof, the MWW template compound preferably comprising piperidine.

As far as the amounts of the silicon source and the boron source employed in (a) are concerned, no specific restrictions exist provided that the B-MWW precursor is obtained. Preferably, the molar ratio of B, calculated as $B_2O_3$ and contained in the boron source, relative to Si, calculated as $SiO_2$ and contained in the Si source, is at least 0.25:1, preferably in the range of from 0.3:1 to 1:1, more preferably from 0.4:1 to 0.8:1, more preferably from 0.4:1 to 0.6:1, more preferably from 0.45:1 to 0.55:1, more preferably from 0.47:1 to 0.52:1

As far as the amounts of the silicon source and the MWW template compound employed in (a) are concerned, no specific restrictions exist provided that the B-MWW precursor is obtained. Preferably, in (a), the molar ratio of the MWW template compound, relative to Si, calculated as $SiO_2$ and contained in the Si source, is in the range of from 0.5:1 to 1.7:1, preferably from 1.0:1 to 1.5:1, more preferably from 1.1:1 to 1.3:1.

As far as the amounts of the silicon source and water in (a) are concerned, no specific restrictions exist provided that the B-MWW precursor is obtained. Preferably, in (a), the molar ratio of $H_2O$ relative to Si, calculated as $SiO_2$ and contained in the Si source, is in the range of from 12:1 to 20:1, preferably from 13:1 to 18:1, more preferably from 14:1 to 16:1.

According to (a), the aqueous synthesis mixture is preferably subjected to hydrothermal synthesis under autogenous pressure, wherein the B-MWW precursor is crystallized. In (a), the crystallization time is preferably in the range of from 1 to 8 days, more preferably from 2 to 5 days. For crystallization purposes, it is conceivable to use at least one suitable seeding material such as a zeolitic material having MWW framework structure. By using seeding material, it is conceivable to achieve crystallization times of less than 24 hours. Preferably according to process of the invention, no seeding material is employed. During the hydrothermal synthesis in (a), the crystallization mixture can be stirred. The stirring rates as such can be suitably chosen depending, for example, on the volume of the aqueous synthesis mixture, the amount of the starting materials employed, the desired temperature, and the like. For example, the stirring rate is in the range of from 40 to 300 r.p.m. (rounds per minute), such as from 50 to 250 r.p.m. The temperature applied during the hydrothermal synthesis in (a) is preferably in the range of from 140 to 200° C., more preferably from 150° C. to 190° C., more preferably from 160 to 180° C., more preferably from 160 to less than 180° C., more preferably from 170 to 177° C.

After hydrothermal synthesis and optionally after acid treatment, the obtained B-MWW precursor is preferably suitably separated from its mother liquor according to (b). All conceivable methods of separating a B-MWW precursor from its mother liquor are possible. These methods include, for example, filtration, ultrafiltration, diafiltration and centrifugation methods or, for instance, spray drying processes and spray granulation processes. A combination of two or more of these methods can be applied.

Preferably, the B-MWW precursor is separated from its mother liquid by filtration, and the thus obtained material, for example in the form of a filter cake, is preferably subjected to washing with at least one suitable washing agent, preferably to washing with water, at a temperature of up to 50° C., preferably from 15 to 50° C., more preferably from 15 to 35° C., more preferably from 20 to 30° C. If washing is applied, it is preferred to continue the washing process until the washing water has a conductivity of at most 1,000 microSiemens/cm, more preferably of at most 800 microSiemens/cm, more preferably of at most 700 microSiemens/cm, more preferably of at most 300 microSiemens/cm, more preferably of at most 250 microSiemens/cm, more preferably of at most 200 microSiemens/cm.

Usually, the mother liquor containing the B-MWW precursor has a pH of above 9 such as above 10, preferably in the range of from 10.5 to 12, more preferably from 11 to 11.5, as determined using a pH electrode. Surprisingly, it was found in the context of the present invention that the above-described separation by filtration can be improved by lowering the pH of the suspension to be subjected to filtration to a value of at most 9, preferably in the range of from 6.5 to 8.5, more preferably from 7 to 8. While there are specific restrictions exist how this pH is achieved, it is preferred to subject the suspension obtained in (a) to an acid treatment.

As far as the nature of the acid is concerned, no specific restrictions exist, provided that the pH of the suspension after the acid treatment is in above-defined preferred ranges. It is conceivable that the used acid is an organic acid, preferably selected from the group consisting of oxalic acid, acetic acid, citric acid, methane sulfonic acid, and a mixture of two or more thereof, and/or an inorganic acid, preferably selected from the group consisting of phosphoric acid, sulphuric acid, hydrochloric acid, nitric acid, and a mixture of two or more thereof. More preferably, the acid is an inorganic acid, more preferably nitric acid. Preferably, the acid is employed as an aqueous solution.

Preferably, the thus acid-treated suspension is directly subjected to (b), more preferably directly subjected to filtration according to (b).

After separation of the B-MWW precursor from the mother liquor, it is possible to recycle at least a part of the mother liquor into (a).

After separation of the B-MWW precursor from the mother liquor, preferably by filtration, and preferably after washing, the washed B-MWW precursor is optionally subjected to pre-drying, for example by subjecting to a suitable gas stream such as air, lean air, or technical nitrogen, preferably at a temperature in the range of from 5 to 200° C., more preferably from 5 to 70° C., more preferably from 20 to 50° C., more preferably from 20 to 40° C., more preferably from 20 to 30° C.

It is preferred that (b) comprises drying, preferably spray-drying the B-MWW precursor. Thus, the filter cake preferably obtained in (b) is preferably suspended in a suitable liquid, preferably water, to allow for the preferred spray-drying. The solid content of such suspension can be suitably chosen to meet the requirements of the preferred spray-drying process. The solids contents of the suspension may be in the range of from 10 to 25 weight-%. Preferred solids contents of the suspension are in the range of from 10 to 20 weight-%, more preferably from 12 to 18 weight-%, more preferably from 14 to 16 weight-%. It is also conceivable to separate the B-MWW precursor directly from its mother liquor by spray-drying, spray-granulation, thin film drying, drum drying or vacuum contact drying, preferably spray-drying. In this case, it is possible to increase or decrease the B-MWW precursor content of the mother liquor prior to separation suitably by concentrating or diluting the suspension. Concentrating may be achieved, for example, by suitable evaporation or filtration. If the drying is accomplished by spray-drying, the drying gas inlet temperature is preferably in the range of from 150 to 600° C., more preferably from 200 to 350° C., and the drying gas outlet temperature is preferably in the range of from 70 to 190° C., more preferably from 120 to 160° C.

After drying, preferably spray-drying, the B-MWW precursor is subjected to calcination to obtain the B-MWW. During calcination, the MWW template compound is preferably at least partially, more preferably essentially completely removed from the framework structure. Preferred calcination temperatures are in the range of from 500 to 700° C., more preferably from 550 to 675° C., more preferably from 600 to 650° C. Preferred atmospheres under which the calcination is carried out include technical nitrogen, air, or lean air. Preferred calcination times are in the range of from 0.1 to 24 h, preferably from 1 to 24 h, more preferably from 2 to 18 h, more preferably from 4 to 12 h. If, for example, the calcination is carried out in a rotary calciner, the calcination times are preferably in the range of from 0.5 to 2 h.

No specific restrictions exist concerning the mode of calcination. Therefore, it is possible to perform the calcination in batch mode, in semi-continuous mode, or on continuous mode. In particular in case the process is carried in a larger scale, it is preferred to perform the calcination in semi-continuous mode or in continuous mode, more preferably in continuos mode. Even more preferably, calcining the B-MWW precursor is carried out in continuous mode with a rate of more than 0.2 kg B-MWW precursor per hour, preferably in the range of from 0.2 to 2.0 kg B-MWW precursor per hour, more preferably from 0.5 to 2.0 kg B-MWW precursor per hour. Conceivable apparatuses which can be used for such a preferred continuous calcination include, for example, a band calciner.

Concerning the particle size distribution of the particles of the B-MWW obtained from (b), no specific restrictions exist. Preferably, in particular in case step (b) comprises spray-drying and the B-MWW particles are obtained in the form of a spray powder, the particles of the B-MWW obtained from (b) have a Dv10 value of at least 1 micrometer such as at least 2 micrometer, preferably in the range of from 2 to 10 micrometer, a Dv50 value of at least 5 micrometer, preferably in the range of from 5 to 20 micrometer and a Dv90 value of at least 12 micrometer such as at least 15 micrometer, preferably in the range of from 50 to 30 micrometer.

The term "Dv10 value" as referred to in the context of the present invention describes the average particle size where 10 vol.-% of the particles have a smaller size. Similarly, the term "Dv50 value" as referred to in the context of the present invention describes the average particle size where 50 vol.-% of the particles have a smaller size, and the term "Dv90 value" as referred to in the context of the present invention describes the average particle size where 90 vol.-% of the particles have a smaller size. In particular, the Dv10, Dv50, and Dv90 values as referred to in the context of the present invention are to be understood as being determined using the apparatus and the respective parameters as specifically described in Reference Example 1.

Preferably, the B-MWW obtained from (b) has a multipoint BET specific surface area of at least 300 $m^2/g$, preferably in the range of from 300 to 500 $m^2/g$, as determined according to DIN 66131.

The zeolitic material having an MWW framework structure, especially preferably the separated, spray-dried and calcined zeolitic material obtained from (b) is subjected to deboronation in (c) by treating the B-MWW with a liquid solvent system wherefrom a zeolitic material having a molar ratio $B_2O_3:SiO_2$ of at most 0.02:1 is obtained, and wherein the zeolitic material is at least partially separated from the liquid solvent system.

Generally, no specific restrictions exist concerning the chemical nature of the liquid solvent system used in (c). Thus, it may be conceivable to use an acidic aqueous system for decreasing the molar ratio $B_2O_3:SiO_2$ of the zeolitic material obtained from (b) to a value of at most 0.02:1. As acids, the liquid solvent system may comprise, for example, hydrochloric acid, sulfuric acid, nitric acid, phosphoric acid, formic acid, acetic acid, propionic acid, oxalic acid, or tartaric acid. Preferably, the liquid solvent system used in (c) is selected from the group consisting of water, monohydric alcohols, polyhydric alcohols, and mixtures of two or more thereof. Concerning the monohydric alcohols and polyhydric alcohols, no specific restrictions exist. Preferably, these alcohols contain from 1 to 6 carbon atoms, more preferably from 1 to 5 carbon atoms, more preferably from 1 to 4 carbon atoms, and more preferably from 1 to 3 carbon atoms. The polyhydric alcohols preferably comprise from 2 to 5 hydroxyl groups, more preferably from 2 to 4 hydroxyl groups, preferably 2 or 3 hydroxyl groups. Especially preferred monohydric alcohols are methanol, ethanol, and propanol like 1-propanol and 2-propanol. Especially preferred polyhydric alcohols are ethane-1,2-diol, propane-1,2-diol, propane-1,3-diol, propane-1,2,3-triol. If mixtures of two or more of above-described compounds are employed, it is preferred that these mixtures comprise water and at least one monohydric and/or at least one polyhydric alcohol. Most preferably, the liquid solvent system consists of water. Therefore, the present invention relates to above-defined process and zeolitic material obtainable or obtained therefrom, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water.

Further, it is especially preferred that the liquid solvent system does not contain an inorganic acid or an organic acid or a salt thereof, the acid being selected from the group consisting of hydrochloric acid, sulfuric acid, nitric acid, phosphoric acid, formic acid, acetic acid, propionic acid, oxalic acid, and tartaric acid. Therefore, the present invention also relates to the process above, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water, and wherein the liquid solvent system does not contain an inorganic or organic acid, or a salt thereof, the acid being selected from the group consisting of hydrochloric acid, sulfuric acid, nitric acid, phosphoric acid, formic acid, acetic acid, propionic acid, oxalic acid, and tartaric acid. Even more preferably, the present invention also relates to the process above, wherein in (c), the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water, wherein preferably, the liquid solvent system does not contain an inorganic or organic acid, or a salt thereof.

As far as the amount of zeolitic material which is employed relative to the amount of liquid solvent system is concerned, no specific restrictions exist. Preferably, in (c), the weight ratio of the liquid solvent system relative to B-MWW is in the range of from 5:1 to 40:1, preferably from 7.5:1 to 30:1, more preferably from 10:1 to 20:1, more preferably from 12:1 to 18:1.

The treating conditions according to (c) are not specifically restricted, provided that the solvent system described above is in its liquid state and that the molar ratio $B_2O_3:SiO_2$ is decreased to a value of at most 0.02:1. In particular, concerning the preferred temperatures described below, the skilled person will choose the respective pressure under which the treating is carried out in order to keep the solvent system in its liquid state.

Concerning the temperature according to (c), no specific restrictions exist. Preferably, the treating according to (c) is carried out at a temperature in the range of from 50 to 125° C., preferably from 90 to 115° C., more preferably from 95 to 105° C.

Concerning the duration of the treating according to (c), no specific restrictions exist. The below mentioned time is to be understood as the time where the liquid solvent system is maintained under the above described treating temperature. Preferably, in (c), the treating is carried out for a period in the range of from 6 to 20 h, preferably from 7 to 17 h, more preferably from 8 to 12 h.

According to the present invention, the treating according to (c) can be carried out under reflux. Thus, the preferred vessel, representing an open system, used for the treating according to (c) is preferably equipped with a reflux condenser. During (c), the temperature of the liquid solvent system is kept essentially constant or changed, the treating with the liquid solvent system thus being carried out at two or more different temperatures. Most preferably, the temperature is kept essentially constant within the above-defined ranges. Thus, it is preferred that in (c), the treating is carried out in an open system under reflux.

According to the present invention, the treating according to (c) can be carried out in a closed system, preferably an autoclave, under autogenous pressure. It is further preferred that in (c), the treating is carried out under autogenous pressure, preferably in an autoclave, without reflux.

During the treatment according to (c), it is further preferred to suitably stir the liquid solvent system. During (c), the stirring rate is kept essentially constant or changed, the treating with the liquid solvent system according to (c) thus being carried out at two or more different stirring rates. Most preferably, the B-MWW is suspended in the liquid solvent system at a first stirring rate, and during the treating at above-described temperatures, the stirring rate is changed, preferably increased. The stirring rates as such can be suitably chosen depending, for example, on the volume of the liquid solvent system, the amount of the B-MWW employed, the desired temperature, and the like. Preferably, the stirring rate under which the treating of the B-MWW at the above-described temperatures is carried out is preferably in the range of from 50 to 300 r.p.m. (rounds per minute), more preferably from 150 to 270 r.p.m., more preferably from 240 to 260 r.p.m.

After the treating according to (c), the obtained zeolitic material having an MWW framework structure and a molar ratio $B_2O_3:SiO_2$ of at most 0.02:1 is suitably at least partially separated from the liquid solvent system according to (c). All methods of separating the zeolitic material having an MWW framework structure from the respective suspension are conceivable. These methods include filtration, ultrafiltration, diafiltration and centrifugation methods or, for instance, spray-drying processes and spray granulation processes. A combination of two or more of these methods can be applied. According to the present invention, the zeolitic material having an MWW framework structure is preferably separated from the suspension by filtration. Preferably, a filter cake is obtained which is preferably subjected to washing, preferably with water. If washing is applied, it may be preferred to continue the washing process until the washing water has a conductivity of at most 1,000 microSiemens/cm, more preferably of at most 850 microSiemens/cm, more preferably of at most 700 microSiemens/cm After separation of the zeolitic material having an MWW framework structure from the suspension, preferably achieved via filtration, and after washing, the washed filter cake containing the zeolitic material having an MWW framework structure is optionally subjected to drying, for example by subjecting the filter cake to a suitable gas stream such as air, lean air, or nitrogen, preferably a nitrogen stream. Thus, it is preferred that prior to (ii), the zeolitic material is subjected to drying. Concerning the duration and the temperature of drying no specific restrictions exist. Preferably, drying is carried out at a temperature in the range of from 100 to 180° C., preferably from 120 to 150° C., for a period in the range of from 5 to 70 h, preferably from 15 to 25 h.

After separation of the zeolitic material having an MWW framework structure from the suspension, preferably by filtration, and preferably after washing, and prior to drying, the washed zeolitic material having an MWW framework structure can be subjected to pre-drying, for example by subjecting to a suitable gas stream such as air, lean air or nitrogen, preferably a nitrogen stream, for a time preferably in the range of from 4 to 10 h, more preferably from 5 to 8 h.

It is preferred that (c) comprises drying, preferably spray-drying the zeolitic material having an MWW framework structure and a molar ratio $B_2O_3:SiO_2$ of at most 0.02:1. Thus, the filter cake preferably obtained in (c), preferably after pre-drying, is preferably suspended in a suitable liquid, preferably water, to allow the preferred spray-drying. The solid content of such suspension can be suitably chosen to meet the requirements of the preferred spray-drying process. It is also conceivable to separate the zeolitic material having an MWW framework structure and a molar ratio $B_2O_3:SiO_2$ of at most 0.02:1 from the respective suspension by spray-drying or spray-granulation, preferably spray-drying. In this case, it is possible to increase the content of the zeolitic material having an MWW framework structure and a molar ratio $B_2O_3:SiO_2$ of at most 0.02:1 of the respective suspension prior to separation suitably by concentrating the suspension. Concentrating may be achieved, for example, by suitable evaporation. If the drying is accomplished by spray-drying, the drying gas inlet temperature is preferably in the range of from 200 to 400° C., more preferably from 230 to 340° C., and the drying gas outlet temperature is preferably in the range of from 120 to 190° C., more preferably from 140 to 170° C.

Preferably, the process of the present invention does not comprise a calcination step generally involving the heating of the zeolitic material having an MWW framework structure and a molar ratio $B_2O_3:SiO_2$ of at most 0.02:1 obtained from (c) above a temperature of 500° C. Thus, it is preferred that the separated and preferably dried zeolitic material having an MWW framework structure and a molar ratio $B_2O_3:SiO_2$ of at most 0.02:1 obtained from (c) is not subjected to calcination.

Concerning the particle size distribution of the particles of the zeolitic material having an MWW framework structure and a molar ratio $B_2O_3:SiO_2$ of at most 0.02:1 obtained from (c), no specific restrictions exist. Preferably, in particular in case step (c) comprises spray-drying and the particles are obtained in the form of a spray powder, the particles obtained from (c) have a Dv10 value in the range of from 1 to 10 micrometer, preferably from 3 to 10 micrometer, more preferably from 4 to 6 micrometer, a Dv50 value in the range of from 5 to 50 micrometer, preferably from 7 to 50 micrometer, more preferably from 8 to 30 micrometer and a Dv90 value in the range of from 12 to 200 micrometer, preferably from 12 to 90 micrometer, more preferably from 13 to 70 micrometer.

Further, it is preferred that the zeolitic material having an MWW framework structure and a molar ratio $B_2O_3:SiO_2$ of at most 0.02:1 obtained from (c) has a multipoint BET specific surface area in the range of from 370 to 500 m²/g, preferably from 380 to 480 m²/g, as determined according to DIN 66131.

According to the present invention, the treatment according to (c) with the liquid solvent system reduces the molar ratio $B_2O_3:SiO_2$ of the zeolitic material framework; thus, it is a procedure for at least partially removing B from the MWW framework structure. Therefore, the molar ratio $B_2O_3:SiO_2$ of the zeolitic material obtained from (b) is higher than the molar ratio $B_2O_3:SiO_2$ of the zeolitic material obtained from (c). Preferably, in (i), the molar ratio $B_2O_3:SiO_2$ is at most 0.01:1, preferably in the range of from 0.001:1 to 0.01:1, more preferably from 0.001:1 to 0.003:1, and wherein at least 99.5 weight-%, more preferably least 99.9 weight-% of the MWW framework structure consist of $B_2O_3$ and $SiO_2$.

It is preferred that the zeolitic material obtained from (i) is in the form of a powder, preferably in the form of a spray powder wherein the spray-powder mass result either from spray-drying in (b) and/or spray-drying in (c), as described above.

Preferably, in stage (i), the zeolitic material having an MWW framework structure comprising $SiO_2$ and $B_2O_3$, wherein the molar ratio $B_2O_3:SiO_2$ is at most 0.02:1 and wherein at least 99 weight-% of the MWW framework structure consist of $B_2O_3$ and $SiO_2$, is provided by a process whose preferred steps and conditions are defined by the following embodiments 1 to 31 and the respective dependencies as indicated:

1. A process for preparing a deboronated aluminum-free containing zeolitic material comprising the framework structure MWW (MWW), comprising
   (a) hydrothermally synthesizing a B-MWW precursor from a synthesis mixture containing water, a silicon source, a boron source, and an MWW template compound obtaining the B-MWW precursor in its mother liquor, the mother liquor having a pH above 9;
   (b) adjusting the pH of the mother liquor, obtained in (a) and containing the B-MWW precursor, to a value in the range of from 6 to 9;
   (c) separating the B-MWW precursor from the pH-adjusted mother liquor obtained in (b) by filtration in a filtration device;
   (d) preferably washing the B-MWW precursor obtained from (c), preferably the filter cake obtained from (c), wherein the washing is preferably performed using water was washing agent;
   (e) optionally drying the B-MWW precursor obtained from (c), preferably from (d), at a temperature in the range of from 5 to 200° C., preferably from 5 to 70° C., more preferably from 20 to 50° C., more preferably from 20 to 40° C., more preferably from 20 to 30° C., wherein the drying is preferably carried out by subjecting the B-MWW to a gas stream, preferably a nitrogen stream;
   (f) preparing a suspension, preferably an aqueous suspension, containing the B-MWW precursor obtained from to (c), preferably from (d), more preferably from (e), and having a solids content in the range of from 10 to 25 weight-%, preferably from 10 to 20 weight-%, preferably from 12 to 18 weight-%, more preferably from 14 to 16 weight-%;
   (g) spray drying the suspension obtained from (f) containing the B-MWW precursor, obtaining a spray powder;
   (h) calcining the spray powder obtained from (g) containing the B-MWW precursor, preferably at a temperature in the range of from 500 to 700° C., more preferably from 550 to 650° C., more preferably from 575 to 625° C. for a period of time in the range of from 0.1 to 24 h, preferably from 1 to 24 h, more preferably from 2 to 18 h, more preferably from 6 to 12 h, obtaining a spray powder of which at least 99 weight-%, more preferably at least 99.5 weight-% consist of the B-MWW;
   (j) deboronating the B-MWW obtained in (h) by treating the B-MWW with a liquid solvent system thereby obtaining a deboronated B-MWW (MWW), wherein the liquid solvent system is selected from the group consisting of water, monohydric alcohols, polyhydric alcohols, and mixtures of two or more thereof, and wherein said liquid solvent system does not contain an inorganic or organic acid or a salt thereof, the acid being selected from the group consisting of hydrochloric acid, sulfuric acid, nitric acid, phosphoric acid, formic acid, acetic acid, propionic acid, oxalic acid, and tartaric acid;
   (k) separating the MWW from the liquid solvent system;
   (l) preferably drying the separated MWW, preferably by spray-drying;
2. The process of embodiment 1, wherein in (a), at least 95 weight-%, preferably at least 99 weight-%, more preferably at least 99.9 weight-% of the synthesis mixture consist of the water, the silicon source, the boron source, and the template compound.
3. The process of embodiment 1 or 2, wherein in (a), the silicon source is selected from the group consisting of fumed silica, colloidal silica, and a mixture thereof, the silicon source preferably being colloidal silica, more preferably ammonia-stabilized silica, the boron source is selected from the group consisting of boric acid, borates, boron oxide, and a mixture of two or more thereof, the boron source preferably being boric acid, and the MWW template compound selected from the group consisting of piperidine, hexamethylene imine, N,N,N,N',N',N'-hexamethyl-1,5-pentanediammonium ion, 1,4-bis(N-methylpyrrolidinium) butane, octyltrimethylammonium hydroxide, heptyltrimethylammonium hydroxide, hexyltrimethylammonium hydroxide, N,N,N-trimethyl-1-adamantylammonium hydroxide, and a mixture of two or more thereof, the MWW template compound preferably being piperidine.
4. The process of any of embodiments 1 to 3, wherein in (a), the synthesis mixture contains the boron source, calculated as elemental boron, relative to the silicon source, calculated as elemental silicon, in a molar ratio in the range of from 0.4:1 to 2.0:1, preferably from 0.6:1 to 1.9:1, more preferably from 0.9:1 to 1.4:1, the water relative to the silicon source, calculated as elemental silicon, in a molar ratio in the range of from 1:1 to 30:1, preferably from 3:1 to 25:1, more preferably from 6:1 to 20:1; and the template compound relative to the silicon source, calculated as elemental silicon, in a molar ratio in the range of from 0.4:1 to 2.0:1, preferably from 0.6:1 to 1.9:1, more preferably from 0.9:1 to 1.4:1.

5. The process of any of embodiments 1 to 4, wherein in (a), the hydrothermal synthesizing is carried out at a temperature in the range of from 160 to less than 180° C., preferably from 170 to 175° C., for a period of time in the range of from 1 to 72 h, preferably from 6 to 60 h, more preferably from 12 to 50 h.

6. The process of any of embodiments 1 to 5, wherein in (a), the hydrothermal synthesizing is carried out at least partially under stirring.

7. The process of any of embodiments 1 to 6, wherein in (a), the synthesis mixture additionally contains a seeding material, preferably a zeolitic material comprising the framework structure MWW, more preferably a boron containing zeolitic material comprising the framework structure MWW.

8. The process of embodiment 7, wherein the synthesis mixture contains the seeding material, relative to the silicon source, in a weight ratio in the range of from 0.01:1 to 1:1, preferably from 0.02:1 to 0.5:1, more preferably from 0.03:1 to 0.1:1, calculated as amount of seeding material in kg relative to silicon contained in the silicon source calculated as silicon dioxide in kg.

9. The process of any of embodiments 1 to 8, wherein the pH of the mother liquor obtained from (a) is above 10, preferably in the range of from 10.5 to 12, more preferably from 11 to 11.5.

10. The process of any of embodiments 1 to 9, wherein in (b), the pH of the mother liquor obtained in (a) is adjusted to a value in the range of from 6.5 to 8.5, preferably from 7 to 8.

11. The process of any of embodiments 1 to 10, wherein in (b), the pH is adjusted by a method comprising
    (i) adding an acid to the mother liquor obtained from (a) containing the B-MWW precursor, wherein the adding is preferably carried out at least partially under stirring.

12. The process of embodiment 11, wherein in (i), the adding is carried out at a temperature in the range of from 10 to 70° C., preferably from 20 to 70° C., more preferably from 30 to 65° C., more preferably from 40 to 60° C.

13. The process of embodiment 11 or 12, wherein in (i), the acid is an inorganic acid, preferably an aqueous solution containing the inorganic acid.

14. The process of embodiment 13, wherein the inorganic acid is selected from the group consisting of phosphoric acid, sulphuric acid, hydrochloric acid, nitric acid, and a mixture of two or more thereof, the inorganic acid preferably being nitric acid.

15. The process of any of embodiments 11 to 14, the method additionally comprising
    (ii) stirring the mother liquor to which the acid was added according to (i), wherein during (ii), no acid is added to the mother liquor.

16. The process of embodiment 15, wherein in (ii), the stirring is carried out at a temperature in the range of from 10 to 70° C., preferably from 20 to 70° C., more preferably from 25 to 65° C., more preferably from 30 to 60° C.

17. The process of any of embodiments 1 to 16, wherein in (b), the size of the particles contained in the mother liquor, expressed by the respective Dv10, Dv50, and Dv90 value, is increased for at least 2%, preferably at least 3%, more preferably at least 4.5% regarding Dv10, for at least 2%, preferably at least 3%, more preferably at least 4.5% regarding Dv50, and for at least 5%, preferably at least 6%, more preferably at least 7% regarding Dv90.

18. The process of any of embodiments 1 to 17, wherein the pH-adjusted mother liquor obtained from (b) has a solids content in the range of from 1 to 10 weight-%, preferably from 4 to 9 weight-%, more preferably from 7 to 8 weight-%, based on the total weight of the pH-adjusted mother liquor obtained from (b).

19. The process of any of embodiments 1 to 18, wherein the pH-adjusted mother liquor obtained from (b) has a filtration resistance in the range of from 10 to 100 mPa*s/m$^2$, preferably from 10 to 50 mPa*s/m$^2$, more preferably from 15 to 45 mPa*s/m$^2$, more preferably from 20 to 40 mPa*s/m$^2$.

20. The process of any of embodiments 1 to 19, wherein in (d), the filter cake obtained from (c) is has a washing resistance in the range of from 5 to 200 mPa*s/m$^2$, preferably from 5 to 150 mPa*s/m$^2$, more preferably from 10 to 50 mPa*s/m$^2$, more preferably from 15 to 45 mPa*s/m$^2$, more preferably from 20 to 40 mPa*s/m$^2$.

21. The process of any of embodiments 1 to 29, wherein in (d), the washing is carried out until the conductivity of the filtrate is at most 300 microSiemens/cm, preferably at most 250 microSiemens/cm, more preferably at most 200 microSiemens/cm.

22. The process of any of embodiments 1 to 21, wherein the residual moisture of the B-MWW precursor obtained from (c), preferably from (d), more preferably from (e), is in the range of from 80 to 90 weight-%, preferably from 80 to 85 weight-%.

23. The process of any of embodiments 1 to 22, wherein in (h), the calcining is carried out in continuous mode, preferably in a rotary calciner, preferably at a throughput in the range of from 0.5 to 20 kg spray powder per h.

24. The process of any of embodiments 1 to 23, wherein the degree of crystallinity of the B-MWW contained in the spray powder obtained from (h) is at least (75±5) %, preferably at least (80±5) %, as determined via XRD.

25. The process of any of embodiments 1 to 24, wherein the BET specific surface area of the B-MWW contained in the spray powder obtained from (h) is at least 300 m$^2$/g, preferably in the range of from 300 to 500 m$^2$/g, as determined according to DIN 66131.

26. The process of embodiment 1, wherein the liquid solvent according to (j) system does not contain an inorganic or organic acid, or a salt thereof.

27. The process of any of embodiments 1 to 26, wherein the liquid solvent system according to (j) is selected from the group consisting of water, methanol, ethanol, propanol, ethane-1,2-diol, propane-1,2-diol, propane-1,3-diol, propane-1,2,3-triol, and mixtures of two or more thereof, preferably water.

28. The process of any of embodiments 1 to 27, wherein the treating according to (j) is carried out at a temperature in the range of from 50 to 125° C., preferably from 70 to 120° C., more preferably from 90 to 115° C., more preferably from 90 to 110° C., more preferably from 90 to 105° C., more preferably from 95 to 105° C., more preferably from 95 to 100° C.

29. The process of any of embodiments 1 to 28, wherein the treating according to (j) is carried out for a time in the range of from 6 to 20 h, preferably from 7 to 17 h, more preferably from 8 to 15 h, more preferably from 9 to 12 h.

30. The process of any of embodiments 1 to 29, wherein the treating according to (j) is carried out with weight ratio of B-MWW relative to the liquid solvent system in the range of from 1:5 to 1:40, more preferably from 1:10 to 1:30, more preferably from 1:10 to 1:20.

31. The process of any of embodiments 1 to 30, comprising
    (m) calcining the MWW obtained from (k) or (l), preferably at temperatures in the range of from 500 to 700° C.

STEP (ii)

According to the present invention, the preferably separated, dried and optionally calcined deboronated B-MWW obtained from (i) is further subjected to step (ii) wherein titanium is introduced into the material to obtain a titanium-containing zeolitic material.

In particular, in (ii), titanium is introduced into the zeolitic material provided in (i) by a process comprising
(ii.1) preparing an aqueous synthesis mixture containing the zeolitic material provided in (i), an MWW template compound and a titanium source, wherein the molar ratio of the MWW template compound relative to Si, calculated as $SiO_2$ and contained in the zeolitic material provided in (i), is in the range of from 0.5:1 to 1.4:1;
(ii.2) hydrothermally synthesizing a titanium-containing zeolitic material having an MWW framework from the aqueous synthesis mixture prepared in (ii.1), obtaining a mother liquor comprising the titanium-containing zeolitic material having an MWW framework structure.

As far as the template compound in (ii.1) is concerned, no specific restrictions exist provided that titanium is introduced into the zeolitic material provided in (i). Preferably, the MWW template compound is selected from the group consisting of piperidine, hexamethylene imine, N,N,N,N', N',N'-hexamethyl-1,5-pentanediammonium ion, 1,4-bis(N-methylpyrrolidinium)butane, octyltrimethylammonium hydroxide, heptyltrimethylammonium hydroxide, hexyltrimethylammonium hydroxide, N,N,N-trimethyl-1-adamantylammonium hydroxide, and a mixture of two or more thereof, the MWW template compound preferably being piperidine.

As far as the titanium source used in (ii.1) is concerned, no specific restrictions exist provided that titanium is introduced into the zeolitic material provided in (i). Preferably, the titanium source is selected from the group consisting of tetrabutylorthotitanate, tetraisopropylorthotitanate, tetraethylorthotitanate, titanium dioxide, titanium tetrachloride, titanium tert-butoxide, and a mixture of two or more thereof, the titanium source preferably being tetrabutylorthotitanate.

Preferably, in the aqueous synthesis mixture used in (ii.1), the molar ratio of Ti, calculated as $TiO_2$ and contained in the titanium source, relative to Si, calculated as $SiO_2$ and contained in the zeolitic material having a molar ratio $B_2O_3:SiO_2$ of at most 0.02:1, is in the range of from 0.005:1 to 0.1:1, preferably from 0.01:1 to 0.08:1, more preferably from 0.02:1 to 0.06:1.

Concerning the amount of water, no specific restrictions exist. Preferably, the molar ratio of $H_2O$ in the aqueous synthesis mixture in (ii.1), relative to Si, calculated as $SiO_2$ and contained in the zeolitic material having a molar ratio $B_2O_3:SiO_2$ of at most 0.02:1, is in the range of from 8:1 to 20:1, preferably from 10:1 to 18:1, more preferably from 12:1 to 16:1.

Preferably, the molar ratio of the MWW template compound relative to Si, calculated as $SiO_2$ and contained in the zeolitic material provided in (i), is in the range of from 0.6:1 to 1.5:1, preferably from 0.8:1 to 1.4.1, more preferably from 1.0:1 to 1.3:1.

The synthesis mixture obtained in (ii.1) is subjected to hydrothermally synthesizing a titanium-containing zeolitic material having an MWW framework structure. It may be conceivable to use at least one suitable seeding material in step (ii.2) to obtain the titanium-containing zeolitic material contained in its mother liquor. For example, a conceivable seeding material is a zeolitic material having an MWW framework structure.

As far as the temperature of the hydrothermal synthesis is concerned, no specific restrictions exist, provided that titanium is incorporated in the desired amount into the zeolitic material having an MWW framework structure provided in (i) and the desired TiMWW is obtained. Preferably, the hydrothermal synthesizing according to (ii.2) is carried out at a temperature in the range of from 80 to 250° C., preferably from 120 to 200° C., more preferably from 160 to 180° C., more preferably from 160 to less than 180° C., more preferably from 170 to 177° C.

Concerning the duration of the treating according to (ii.2), no specific restrictions exist. The below mentioned time is to be understood as the time during which the aqueous synthesize mixture obtained in (ii.1) is maintained under the above described treating temperature. Preferably, the hydrothermal synthesizing according to (ii.2) is carried out for a period in the range of from 10 to 100 h, more preferably from 20 to 80 h, more preferably from 40 to 60 h.

Generally, no specific restrictions exist concerning the type of vessel used in (ii.2). Preferably, the hydrothermal synthesis according to (ii.2) is carried out in a closed system under autogenous pressure.

During the hydrothermal synthesis according to (ii.2), it is preferred to suitably stir the synthesis mixture wherein the stirring rate is kept essentially constant or is changed. The stirring rate as such can be suitably chosen depending, for example, on the volume of the aqueous synthesis mixture, the amount of the zeolitic material employed, the desired temperature, and the like. Preferably, the stirring rate under which the treating of the zeolitic material at the above-described temperatures is carried out is preferably in the range of from 50 to 300 r.p.m. (rounds per minute), more preferably from 70 to 150 r.p.m., more preferably from 90 to 120 r.p.m.

It is preferred that neither during (ii.2), nor after (ii.2) and before (iii), the titanium-containing zeolitic material having an MWW framework structure is separated from its mother liquor. Thus, the titanium-containing zeolitic material is not subjected to filtration, ultrafiltration, diafiltration and/or centrifugation methods, neither during (ii.2), nor after (ii.2) and before (iii). Surprisingly, it was found that such separation step can be avoided, which renders the overall process even more advantageous.

After synthesizing the titanium-containing zeolitic material having an MWW framework structure in (ii.2), it is possible to increase the titanium-containing zeolitic material having an MWW framework structure content in the mother liquor by concentrating the suspension or to decrease the titanium-containing zeolitic material having an MWW framework structure content in the mother liquor by diluting the suspension. Such concentration or dilution is preferred if the solid content of the suspension obtained from (ii.2) is not in the preferred range of from 2 to 30 weight-%, more preferably from 5 to 25 weight-%, more preferably from 7 to 23 weight-%, more preferably from 10 to 20 weight-%, based on the total weight of the mother liquor comprising the titanium-containing zeolitic material having an MWW framework structure. In this case, concentration or dilution is performed to prepare a suspension having such preferred solid contents.

Therefore, the present invention also relates to the process as described above, wherein the mother liquor subjected to (iii) comprising the titanium-containing zeolitic material having an MWW framework structure has a solids content, optionally after concentration or dilution, in the range of from 5 to 25 weight-%, more preferably from 10 to 20 weight-%, based on the total weight of the mother liquor comprising the titanium-containing zeolitic material.

STEP (iii)

After the hydrothermal synthesis of the titanium-containing zeolitic material having an MWW framework structure described above, the thus obtained mother liquor comprising the titanium-containing zeolitic material is directly subjected to spray-drying.

Concerning the spray-drying conditions, no specific restrictions exist. Preferably, during spray-drying according to (iii), the drying gas inlet temperature is in the range of from 200 to 700° C., preferably from 200 to 350° C., and the drying gas outlet temperature is in the range of from 70 to 190° C.

As far as the composition of the titanium-containing zeolitic material having an MWW framework structure obtained from (iii) regarding the silicon, carbon and titanium contents is concerned, no specific restrictions exist. Preferably, the titanium-containing zeolitic material having an MWW framework structure obtained from (iii) has a silicon content in the range of from 30 to 40 weight-%, calculated as elemental silicon, a total organic carbon content of from 0 to 14 weight-%, and a titanium content of from 2.1 to 2.8 weight-%, calculated as elemental titanium, each based on the total weight of the zeolitic material.

Concerning the particle size distribution of the titanium-containing zeolitic material having an MWW framework structure obtained from (iii), no specific restrictions exist. It is preferred that the particles of the zeolitic material having an MWW framework structure obtained from (iii) have a Dv10 value in the range of from 1 to 10 micrometer, preferably from 3 to 10 micrometer, more preferably from 4 to 6 micrometer, a Dv50 value in the range of from 5 to 50 micrometer, preferably from 7 to 50 micrometer, more preferably from 8 to 30 micrometer and a Dv90 value in the range of from 12 to 200 micrometer, preferably from 12 to 90 micrometer, more preferably from 13 to 70 micrometer.

Generally, it is conceivable that the titanium-containing zeolitic material having an MWW framework structure obtained from (iii) in the form of a spray powder is used as such, for example as a catalyst, as a catalyst precursor, as a catalyst support, optionally after pre-drying and/or drying and/or calcination. For example, if used as a catalyst, it can be employed in epoxidation reaction, optionally additionally containing at least one noble metal or in combination with a noble metal containing catalyst, in case the epoxidation reaction is carried out making use of hydrogen and oxygen as starting materials wherein hydrogen peroxide is formed in situ during the epoxidation reaction. In case hydrogen peroxide is used as starting material, the titanium-containing zeolitic material having an MWW framework structure obtained from (iii) in the form of a spray powder can be used as sole epoxidation catalyst. Yet further, it is possible, in case the titanium-containing zeolitic material having an MWW framework structure obtained from (iii) in the form of a spray powder is used as a catalyst precursor, that the titanium-containing zeolitic material having an MWW framework structure obtained from (iii) in the form of a spray powder is subjected to a molding process, optionally in combination with at least one binder, preferably a silica binder. Still further, either the spray powder as such, or the spray powder prior to the molding process, or the molding containing the spray powder, can be subjected to an impregnation stage wherein preferably zinc is impregnated on the spray powder or the molding. Such zinc impregnated powder or molding can be preferably used as epoxidation catalyst.

Preferably, the spray-dried titanium-containing zeolitic material having an MWW framework structure obtained from (iii) is subjected to stage (iv) wherein the titanium-containing zeolitic material having an MWW framework structure is treated with an aqueous solution having a 25 pH of at most 5.

Preferably, the process of the present invention does not comprise a calcination step generally involving the heating of the titanium-containing zeolitic material having an MWW framework structure obtained from (iii) above a temperature of 500° C. Thus, it is preferred that after (iii) and before (iv), the spray-dried titanium-containing zeolitic material having an MWW framework structure obtained from (iii) is not subjected to calcination.

As far as the amount of the aqueous solution used in (iv) is concerned, no specific restrictions exist. Preferably, the weight ratio of the aqueous solution relative to the titanium-containing zeolitic material having an MWW framework structure is in the range of from 10:1 to 30:1, preferably from 15:1 to 25:1, more preferably from 18:1 to 22:1.

Preferably, in (iv), the titanium-containing zeolitic material having an MWW framework structure obtained from (iii) is treated with an aqueous solution which comprises an acid. It is conceivable that the aqueous solution used in (iv) comprises an organic acid and/or an inorganic acid, The organic acid is preferably selected from the group consisting of oxalic acid, acetic acid, citric acid, methane sulfonic acid, and a mixture of two or more thereof. Preferably, the aqueous solution used in (iv) comprises an inorganic acid, preferably selected from the group consisting of phosphoric acid, sulphuric acid, hydrochloric acid, nitric acid, and a mixture of two or more thereof, the aqueous solution preferably comprising nitric acid. It is most preferred that the aqueous solution comprises no organic acid. Preferably, in (iv), the aqueous solution has a pH in the range of from 0 to 5, preferably from 0 to 3, more preferably from 0 to 2. The pH values are to be understood as being determined with a pH sensitive glass electrode.

Concerning the temperature of the treating with the aqueous solution according to (iv), no specific restrictions exist. Preferably, in (iv), the titanium-containing zeolitic material having an MWW framework structure is treated with the aqueous solution at a temperature in the range of from 50 to 175° C., preferably from 70 to 125° C., more preferably from 95 to 105° C. Preferably, in (iv), the titanium-containing zeolitic material having an MWW framework structure is treated with the aqueous solution for a period in the range of from 0.1 to 6 h, more preferably from 0.3 to 2 h, more preferably from 0.5 to 1.5 h.

While concerning the type of vessel in which heating in (iv) is conducted, no particular restrictions exist, the vessel is suitably chosen to allow to treat the titanium-containing zeolitic material having an MWW framework structure at the temperatures described above, at which temperatures the solvent system is in its liquid state. Therefore, as far as higher temperatures are concerned, in (iv), the treating is carried out in a closed system under autogenous pressure.

During the treating according to (iv), it is preferred to suitably stir the aqueous solution containing the titanium-containing zeolitic material having an MWW framework structure. During (iv), the stirring rate is kept essentially constant or changed. The stirring rate as such can be suitably chosen depending, for example, on the volume of the aqueous solution, the amount of the zeolitic material employed, the desired temperature, and the like. Preferably, the stirring rate under which the treating of the titanium-containing zeolitic material having an MWW framework structure at the above-described temperatures is carried out is preferably in the range of from 50 to 300 r.p.m. (rounds per minute), more preferably from 100 to 250 r.p.m., more preferably from 180 to 220 r.p.m.

After treating the titanium-containing zeolitic material having an MWW framework structure obtained from (iii) with an aqueous solution having a pH of at most 5 according to (iv), it is preferred to separate the titanium-containing zeolitic material having an MWW framework structure from the aqueous solution.

All conceivable methods of separating the titanium-containing zeolitic material having an MWW framework structure from the aqueous solution are generally possible. These methods include, for example, filtration, ultrafiltration, diafiltration and centrifugation methods or, for instance, spray drying processes and spray granulation processes. A combination of two or more of these methods can be applied.

According to an embodiment of the present invention, it is preferred to separate the titanium-containing zeolitic material having an MWW framework structure from the aqueous solution by direct spray-drying. Prior to spray-drying, it is possible to increase the titanium-containing zeolitic material having an MWW framework structure content in the aqueous solution by concentrating the suspension or to decrease the titanium-containing zeolitic material having an MWW framework structure content in the aqueous solution by diluting the suspension. Preferably, after spray-drying, the titanium-containing zeolitic material having an MWW framework structure is subjected to washing with at least one suitable washing agent, preferably to washing with water, preferably at a temperature of up to 50° C., more preferably from 15 to 50° C., more preferably from 15 to 35° C., more preferably from 20 to 30° C.

According to a preferred embodiment of the present invention, the titanium-containing zeolitic material having an MWW framework structure is separated from the aqueous solution by suitable filtration, and the thus obtained material, for example in the form of a filter cake, is preferably subjected to washing with at least one suitable washing agent, preferably to washing with water, preferably at a temperature of up to 50° C., more preferably from 15 to 50° C., more preferably from 15 to 35° C., more preferably from 20 to 30° C.

If washing is applied, it is preferred to continue the washing process until the washing water has a conductivity of at most 1,000 microSiemens/cm, more preferably of at most 800 microSiemens/cm, more preferably of at most 700 microSiemens/cm.

Thus, the present invention relates to a process as described above and further comprising (v) separating the titanium-containing zeolitic material having an MWW framework structure obtained from (iv) from the aqueous solution, optionally followed by washing the separated titanium-containing zeolitic material having an MWW framework.

Optionally, step (v) may further comprise pre-drying and/or drying the separated titanium-containing zeolitic material having an MWW framework structure. If pre-drying is performed, it is possible subjected subjecting the zeolitic material to a suitable gas stream such as air, lean air, or technical nitrogen, for a time preferably in the range of from 4 to 10 h, more preferably from 5 to 8 h. If drying is performed, it is preferred to subject the optionally predried zeolitic material to a temperature in the range of from 100 to 180° C., preferably from 110 to 150° C., for a period in the range of from 1 to 48 h, preferably from 2 to 12 h, in a suitable atmosphere such as air, lean air, or technical nitrogen.

After treating the titanium-containing zeolitic material having an MWW framework structure with the aqueous solution according to (iv), preferably after separating the titanium-containing zeolitic material having an MWW framework structure from the aqueous solution according to (v), and optionally, but not preferably, after pre-drying and/or drying and/or calcination, the titanium-containing zeolitic material is subjected to spray-drying.

Therefore, it is preferred to prepare a suspension based on the preferably separated zeolitic material, more preferably an aqueous suspension containing the titanium-containing zeolitic material having an MWW framework structure obtained from (iv), preferably from (v). As far as the solid content in the aqueous suspension containing the titanium-containing zeolitic material is concerned, no specific restrictions exist. Preferably, the solid content of the aqueous suspension containing the titanium-containing zeolitic material is in the range of from 2 to 35 weight-%, preferably from 5 to 25 weight-%, more preferably from 10 to 20 weight-%, based on the total weight of the suspension.

Therefore, the present invention also relates to a process described above, further comprising (vi) preparing a suspension, preferably an aqueous suspension containing the titanium-containing zeolitic material having an MWW framework structure obtained from (iv), preferably from (v), said suspension having a solids content preferably in the range of from 5 to 25 weight-%, more preferably from 10 to 20 weight-%, based on the total weight of the suspension, and subjecting the suspension to spray-drying.

Generally, no specific restrictions exist concerning the spray-drying conditions. Preferably, during spray-drying, the drying gas inlet temperature is in the range of from 200 to 700° C., more preferably from 200 to 330° C., and the drying gas outlet temperature is in the range of from 100 to 180° C., more preferably from 120 to 180° C.

While it is generally possible to use the dried material obtained from (v) or the spray-dried material obtained from (vi) for example as a catalyst, a catalyst precursor, or a catalyst support as described above, it is preferred that the above defined process further comprises calcining the titanium-containing zeolitic material having an MWW framework structure obtained from (iv), preferably from (v), more preferably from (vi), wherein the calcining is preferably carried out at a temperature in the range of from 400 to 800° C., more preferably from 600 to 700° C.

Therefore, the present invention also relates to the process as described above, further comprising (vii) calcining the titanium containing zeolitic material having an MWW framework structure obtained from (iv), preferably from (v), more preferably from (vi), wherein the calcining is preferably carried out at a temperature in the range of from 400 to 800° C., more preferably from 600 to 700° C.

Concerning the calcination of the zeolitic material obtained from (iv), preferably from (v), more preferably from (vi), it is preferred that the calcining is carried out in continuous mode, preferably with a rate of more than 0.2 kg zeolitic material per hour, more preferably in the range of from 0.2 to 2.0 kg zeolitic material per hour, more preferably from 0.5 to 2.0 kg zeolitic material per hour.

Preferred Zeolitic Materials

The present invention also relates to a spray powder comprising a titanium-containing zeolitic material having an MWW framework structure, wherein at least 99 weight-%, preferably at least 99.5 weight-%, more preferably at least 99.9 weight-% of the framework structure consist of titanium, silicon, and oxygen, and wherein at least 99 weight-% of, preferably at least 99.5 weight-%, more preferably at least 99.9 weight-% of the spray powder consist of the titanium-containing zeolitic material having an MWW framework structure, wherein the lattice parameter c of the titanium-containing zeolitic material having an MWW framework structure is (25.2±0.2) Angstrom, as determined via XRD.

The present invention also relates to a spray powder which is obtainable or obtained according to a process as described above, preferably from step (iv) of the process as described above, more preferably from step (v) of the process as described above, more preferably from step (vi) of the process as described above.

Compared to known processes, it was surprisingly found that the process of the present invention has an influence on the interlayer distance of the titanium-containing zeolitic material having an MWW framework structure in that an decreased interlayer distance is obtained when preparing a titanium containing zeolitic material having MWW framework structure according to the process of the invention. This interlayer distance is usually expressed by the lattice parameter c of the framework structure, which has a value of (25.2±0.2) Angstrom and which is determined via XRD.

Further, it was surprisingly found that the process of the present invention also has an influence on the UV/VIS spectrum of the titanium-containing zeolitic material having an MWW framework structure in that compared to the material prepared according to known processes, the UV/VIS spectrum shows a band with a maximum to the range of from 200 to 220 nm and further, shows no band with a maximum in the range of at least 250 nm. Therefore, the present invention also relates to above-described spray powder, wherein the UV/VIS spectrum of the titanium-containing zeolitic material having an MWW framework structure has a band with a maximum in the range of from 200 to 220 nm, and has no band with a maximum in the range of at least 250 nm.

Preferably, the crystallinity of the titanium-containing zeolitic material having an MWW framework structure contained in the spray powder of the present invention, as determined via XRD, is at least (77±5) %, preferably at last (80±5) %, more preferably at least (82±5) %. The crystallinity as referred to herein is to be understood as being determined as described in Reference Example 3.

As far as the titanium content and the silicon content of the spray-powder of the present invention are concerned, no specific restrictions exist. Preferably, the spray powder has a titanium content, calculated as elemental titanium based on the total weight of the spray powder, in the range of from 1.5 to 2.0 weight-%, preferably from 1.8 to 2.0 weight-%, and a silicon content, calculated as elemental silicon based on the total weight of the spray powder, in the range of from 44 to 48 weight-%, preferably from 44 to 46 weight-%.

Preferably, the spray-powder of the present invention is present in the form of particles which have a Dv10 value in the range of from 1 to 10 micrometer, preferably from 3 to 10 micrometer, more preferably from 4 to 6 micrometer, a Dv50 value in the range of from 5 to 50 micrometer, preferably from 7 to 50 micrometer, more preferably from 8 to 30 micrometer and a Dv90 value in the range of from 12 to 200 micrometer, preferably from 12 to 90 micrometer, more preferably from 13 to 70 micrometer.

Preferably, the spray powder of the present invention comprises mesopores having an average pore diameter (4V/A) in the range of from 10 to 50 nm, preferably from 15 to 45 nm, as determined by Hg porosimetry according to DIN 66133, and comprising macropores having an average pore diameter (4V/A) in the range of from more than 50 nanometer preferably in the range of from 0.06 to 3 micrometer, as determined by Hg porosimetry according to DIN 66133.

Preferably, the spray powder of the present invention has a boron content, calculated as elemental boron, of at most 0.1 weight-%, based on the total weight of the spray powder.

Preferably, the spray powder of the present invention has a total organic carbon (TOC) content of at most 0.1 weight, based on the total weight of the spray powder.

Further Process Steps

Generally, it is possible to employ the spray powder according to the present invention as such, without any further modifications, for example as a catalyst, as a catalyst support, as a molecular sieve, as an adsorbent, as a filler, or the like.

It is also conceivable that based on the spray powder of the present invention, a molding is prepared containing the spray powder. In such a process, the spray powder, optionally after further modification, is suitably shaped and optionally post-treated. Such modifications may comprise impregnation of the spray powder with a solution containing at least one heteroatom, thereby incorporating at least one heteroatom. Further, the molding may be suitably treated to incorporate at least one nobler metal. Therefore, the present invention also relates to a process as described above, further comprising (viii) shaping the titanium containing zeolitic material having an MWW framework structure obtained from obtained in (iv) or (v) or (vi) or (vii), preferably in (vii), optionally after suitable modification, preferably after incorporation of at least one heteroatom, preferably via impregnation, obtaining a molding;

(ix) optionally drying and/or calcining the molding obtained in (viii);

(x) optionally subjecting the molding obtained in (viii) or (ix), preferably in (ix), to a water-treatment, wherein the water-treatment comprises treating the molding with liquid water in an autoclave under autogenous pressure at a temperature in the range of from 100 to 200° C.;

(xi) optionally drying and/or calcining the water-treated molding.

Suitable heteroatoms according to (viii) include, but are not limited, to Al, Zr, V, Nb, Ta, Cr, Mo, W, Mn, Fe, Co, Ni, Zn, Ga, Ge, In, Sn, Pb, and a mixture of two or more thereof. Preferably, Zn is incorporated via impregnation.

For shaping in (viii), the optionally modified titanium containing zeolitic material having an MWW framework structure can be admixed with at least one binder and/or with at least one binder precursor, and optionally with at least one pore-forming agent and/or at least one plasticizing agent.

Examples of such binders are metal oxides, such as, for example, $SiO_2$, $Al_2O_3$, $TiO_2$, $ZrO_2$ or MgO or clays or mixtures of two or more of these oxides or mixed oxides of at least two of Si, Al, Ti, Zr, and Mg. Clay minerals and naturally occurring or synthetically produced alumina, such as, for example, alpha-, beta-, gamma-, delta-, eta-, kappa-, chi- or theta-alumina and their inorganic or organometallic precursor compounds, such as, for example, gibbsite, bayerite, boehmite or pseudoboehmite or trialkoxyaluminates, such as, for example, aluminum triisopropylate, are particularly preferred as $Al_2O_3$ binders. Further conceivable binders might be amphiphilic compounds having a polar and a non-polar moiety and graphite. Further binders might be, for example, clays, such as, for example, montmorillonites, kaolins, metakaoline, hectorite, bentonites, halloysites, dickites, nacrites or anaxites. These binders can be used as such or in the form of suitable precursor compounds which, either during spray-drying and/or the subsequent calcination form the desired binder. Examples of such binder precursors are tetraalkoxysilanes, tetraalkoxytitanates, tetraalkoxyzirconates or a mixture of two or more different tetraalkoxysilanes or a mixture of two or more different tetraalkoxytitanates or a mixture of two or more different tetraalkoxyzirconates or a mixture of at least one tetraalkoxysilane and at least one tetraalkoxytitanate or of at least one tetraalkoxysilane and at least one tetraalkoxyzirconate or of at least one tetraalkoxytitanate and at least one tetraalkoxyzirconate or a mixture of at least one tetraalkoxysilane and at least one tetraalkoxytitanate and at least one tetraalkoxyzirconate. In the context of the present invention binders which either completely or partly comprise $SiO_2$, or which are a precursor of $SiO_2$, from which $SiO_2$ is formed, may be preferred. In this context, both colloidal silica and so-called "wet process" silica and so-called "dry process" silica can be used. Particularly preferably this silica is amorphous silica, the size of the silica particles being, for example, in the range of from 5 to 100 nm and the surface area of the silica particles being in the range of from 50 to 500 $m^2/g$. Colloidal silica, preferably as an alkaline and/or ammoniacal solution, more preferably as an ammoniacal solution, is commercially available, inter alia, for example as Ludox®, Syton®, Nalco® or Snowtex®. "Wet process" silica is commercially available, inter alia, for example as Hi-Sil®, Ultrasil®, Vulcasil®, Santocel®, Valron-Estersil®, Tokusil® or Nipsil®. "Dry process" silica is commercially available, inter alia, for example as Aerosil®, Reolosil®, Cab-O-Sil®, Fransil® or ArcSilica®. Inter alia, an ammoniacal solution of colloidal silica is preferred in the present invention.

Pore forming agents include, but are not limited to, polymers such as polymeric vinyl compounds, such as polyalkylene oxides like polyethylene oxides, polystyrene, polyacrylates, polymethacrylates, polyolefins, polyamides and polyesters, carbohydrates, such as cellulose or cellulose derivatives like methyl cellulose, or sugars or natural fibers. Further suitable pore forming agents may be, for example, pulp or graphite. If desired with regard to the pore characteristics be achieved, a mixture of two or more pore forming agents may be used. In a particularly preferred embodiment of the process according to the invention, the pore forming agents are removed by calcination according to (ix) and/or (xi).

Therefore, the present invention also relates to the spray-powder as described above, comprised in a molding, said molding optionally comprising at least binder, preferably a silica binder. Also, the present invention relates to a molding comprising the spray powder according to the present invention, the molding optionally comprising at least one binder, preferably a silica binder.

Preferred Uses

The zeolitic materials according to the present invention, in particular the spray powder of the present invention, preferably obtainable or obtained by the process according to the invention, and/or the moldings containing the zeolitic materials according to the invention, can be used as such for every conceivable purpose such as catalysts, catalyst supports, catalyst precursors, molecular sieves, adsorbents, fillers, and the like.

According to a preferred embodiment, the spray powder or the molding comprising the spray powder are used as a catalyst or as a co-catalyst, preferably as an oxidation reaction catalyst, more preferably an epoxidation reaction catalyst, more preferably as a catalyst for the epoxidation of an olefin, in particular of propene. Further, the present invention relates to an oxidation process, preferably an epoxidation process, more preferably a process for the epoxidation of an olefin, more preferably for the epoxidation of propene, wherein the spray powder of the present invention or the molding containing the spray powder of the present invention is employed as a catalyst. According to this embodiment, the spray powder or the molding comprising the spray powder optionally additionally contains or supports at least one noble metal, in particular in case the epoxidation reaction is performed starting from hydrogen and oxygen as starting materials, wherein hydrogen peroxide is formed in situ during the epoxidation reaction. According to this embodiment, the spray powder or the molding comprising the spray powder can be used as catalyst in addition to a further catalyst which forms hydrogen peroxide in situ from hydrogen and oxygen.

According to an especially preferred embodiment, the spray powder or the molding comprising the spray powder, in particular the spray powder, is used as a catalyst precursor in a process for preparing a catalyst, wherein the process preparing a catalyst comprises impregnating the spray powder or the molding, in particular the spray powder, with at least one zinc containing compound and optionally forming the impregnated spray powder to a molding, optionally containing at least one binder, preferably a silica binder. Also, the present invention relates to a process for the preparation of a ZnTiMWW catalyst, comprising impregnating the spray powder or the molding, in particular the spray powder, with at least one zinc containing compound and optionally forming the impregnated spray powder or the molding, in particular the spray powder, to a molding, optionally containing at least one binder, preferably a silica binder.

The present invention is further characterized by the following embodiments and the combinations of these embodiments as indicated by the respective dependencies:

1. A process for the preparation of a titanium-containing zeolitic material having an MWW framework structure comprising
    (i) providing a zeolitic material having an MWW framework structure comprising $SiO_2$ and $B_2O_3$, wherein the molar ratio $B_2O_3:SiO_2$ is at most 0.02:1 and wherein at least 99 weight-% of the MWW framework structure consist of $B_2O_3$ and $SiO_2$;
    (ii) incorporating titanium into the zeolitic material provided in (i) comprising
        (ii.1) preparing an aqueous synthesis mixture containing the zeolitic material provided in (i), an MWW template compound and a titanium source, wherein the molar ratio of the MWW template compound relative to Si, calculated as $SiO_2$ and contained in the zeolitic material provided in (i), is in the range of from 0.5:1 to 1.4:1;
  - (ii.2) hydrothermally synthesizing a titanium-containing zeolitic material having an MWW framework structure from the aqueous synthesis mixture prepared in (ii.1), obtaining a mother liquor comprising the titanium-containing zeolitic material having an MWW framework structure;
- (iii) spray-drying the mother liquor obtained from (ii.2) comprising the titanium-containing zeolitic material having an MWW framework structure.

2. The process of claim 1, wherein in (i), the zeolitic material having an MWW framework structure is provided by a process comprising
  - (a) hydrothermally synthesizing a B-MWW precursor comprising $SiO_2$ and $B_2O_3$ with a molar ratio $B_2O_3$:$SiO_2$ of greater than 0.02:1 from a synthesis mixture containing a silicon source, a boron source, and an MWW template compound, obtaining the B-MWW precursor in its mother liquor;
  - (b) separating the B-MWW precursor from its mother liquor, and calcining the separated B-MWW precursor, obtaining a B-MWW;
  - (c) deboronating the B-MWW obtained from (b) by treating the B-MWW with a liquid solvent system obtaining the zeolitic material having an MWW framework structure and a molar ratio $B_2O_3$:$SiO_2$ of at most 0.02:1, and at least partially separating the zeolitic material from the liquid solvent system.

3. The process of embodiment 2, wherein in (a), the silicon source comprises ammonia stabilized colloidal silica, the boron source comprises boric acid, and the MWW template compound is selected from the group consisting of piperidine, hexamethylene imine, N,N,N,N',N',N'-hexamethyl-1,5-pentanediammonium ion, 1,4-bis(N-methylpyrrolidinium)butane, octyltrimethylammonium hydroxide, heptyltrimethylammonium hydroxide, hexyltrimethylammonium hydroxide and a mixture of two or more thereof, the MWW template compound preferably being piperidine.

4. The process of embodiment 2 or 3, wherein the pH of the suspension obtained in (a) is greater than 10, preferably at least 10.5, more preferably at least 11, and wherein after (a) and before (b), the pH of the suspension obtained in (a) is adjusted to a value of at most 10, preferably at most 9, more preferably at most 8, more preferably in the range of from 7 to 8.

5. The process of embodiment 4, wherein the pH of the suspension obtained in (a) is adjusted by subjecting the suspension obtained in (a) to an acid treatment, wherein the acid is preferably an inorganic acid, more preferably selected from the group consisting of phosphoric acid, sulphuric acid, hydrochloric acid, nitric acid, and a mixture of two or more thereof, the acid more preferably being nitric acid.

6. The process of embodiment 4 or 5, wherein after the acid treatment, the suspension is subjected to filtration according to (b).

7. The process of any embodiments 2 to 6, wherein (b) comprises drying the B-MWW precursor, preferably spray-drying the B-MWW precursor.

8. The process of any of embodiments 2 to 7, wherein in (b) calcining the B-MWW precursor is carried out at a temperature in the range of from 400 to 800° C., more preferably from 600 to 700° C.

9. The process of embodiment 8, wherein calcining the B-MWW precursor is carried out in continuous mode, preferably with a rate of more than 0.2 kg B-MWW precursor per hour, more preferably in the range of from 0.2 to 2.0 kg B-MWW precursor per hour, more preferably from 0.5 to 1.5 kg B-MWW precursor per hour.

10. The process of any of embodiments 7 to 9, wherein in (b), the B-MWW is obtained in the form of particles having a Dv10 value in the range of from 1 to 10 micrometer, preferably from 3 to 10 micrometer, more preferably from 4 to 6 micrometer, a Dv50 value in the range of from 5 to 50 micrometer, preferably from 7 to 50 micrometer, more preferably from 8 to 30 micrometer and a Dv90 value in the range of from 12 to 200 micrometer, preferably from 12 to 90 micrometer, more preferably from 13 to 70 micrometer.

11. The process of any of embodiments 7 to 10, wherein the B-MWW obtained in (b) has a multipoint BET specific surface area of at least 300 $m^2$/g, preferably in the range of from 300 to 500 $m^2$/g, as determined according to DIN 66131.

12. The process of any of embodiments 2 to 11, wherein in (c), the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water, wherein preferably, the liquid solvent system does not contain an inorganic or organic acid, or a salt thereof.

13. The process of any of embodiments 2 to 12, wherein in (c), the weight ratio of the liquid solvent system relative to the B-MWW is in the range of from 5:1 to 40:1, preferably from 7.5:1 to 30:1, more preferably from 10:1 to 20:1.

14. The process of any of embodiments 2 to 13, wherein in (c), the treating is carried out at a temperature in the range of from 50 to 125° C., preferably from 90 to 115° C., more preferably from 95 to 105° C.

15. The process of any of embodiments 2 to 14, wherein in (c), the treating is carried out for a period in the range of from 6 to 20 h, preferably from 7 to 17 h, more preferably from 8 to 12 h.

16. The process of any of embodiments 2 to 15, wherein in (c), the treating is carried out in an open system under reflux or in a closed system without reflux.

17. The process of any of embodiments 2 to 16, wherein (c) comprises drying, preferably spray-drying the zeolitic material having an MWW framework structure and a molar ratio $B_2O_3$:$SiO_2$ of at most 0.02:1.

18. The process of any of embodiments 2 to 17, wherein the separated and preferably dried zeolitic material having an MWW framework structure and a molar ratio $B_2O_3$:$SiO_2$ of at most 0.02:1 obtained from (c) is not subjected to calcination prior to (ii).

19. The process of any of embodiments 2 to 18, wherein in (c), the zeolitic material having an MWW framework structure and a molar ratio $B_2O_3$:$SiO_2$ of at most 0.02:1 is obtained in the form of particles having a Dv10 value in the range of from 1 to 10 micrometer, preferably from 3 to 10 micrometer, more preferably from 4 to 6 micrometer, a Dv50 value in the range of from 5 to 50 micrometer, preferably from 7 to 50 micrometer, more preferably from 8 to 30 micrometer and a Dv90 value in the range of from 12 to 200 micrometer, preferably from 12 to 90 micrometer, more preferably from 13 to 70 micrometer.

20. The process of any of embodiments 2 to 19, wherein the zeolitic material having an MWW framework structure and a molar ratio $B_2O_3$:$SiO_2$ of at most 0.02:1 obtained from (c) has a multipoint BET specific surface area in the range of from 370 to 500 m²/g, preferably from 380 to 480 m²/g, as determined according to DIN 66131.

21. The process of any of embodiments 1 to 20, wherein the molar ratio $B_2O_3:SiO_2$ of the zeolitic material having an MWW framework structure provided in (i) is at most 0.01:1, preferably in the range of from 0.001:1 to 0.01:1, more preferably from 0.001:1 to 0.003:1, wherein at least 99.5 weight-%, more preferably least 99.9 weight-% of the MWW framework structure consist of $B_2O_3$ and $SiO_2$.

22. The process of any of embodiments 1 to 21, wherein in (ii.1), the MWW template compound is selected from the group consisting of piperidine, hexamethylene imine, N,N,N,N',N',N'-hexamethyl-1,5-pentanediammonium ion, 1,4-bis(N-methylpyrrolidinium)butane, octyltrimethylammonium hydroxide, heptyltrimethylammonium hydroxide, hexyltrimethylammonium hydroxide, and a mixture of two or more thereof, the MWW template compound preferably being piperidine.

23. The process of any of embodiments 1 to 22, wherein in (ii.1), the titanium source is selected from the group consisting of tetrabutylorthotitanate, tetraisopropylorthotitanate, tetra-ethylorthotitanate, titanium dioxide, titanium tetrachloride, titanium tert-butoxide, and a mixture of two or more thereof, the titanium source preferably being tetrabutylorthotitanate.

24. The process of any of embodiments 1 to 23, wherein in the aqueous synthesis mixture in (ii.1), the molar ratio of Ti, calculated as $TiO_2$ and contained in the titanium source, relative to Si, calculated as $SiO_2$ and contained in the zeolitic material having a molar ratio $B_2O_3:SiO_2$ of at most 0.02:1, is in the range of from 0.005:1 to 0.1:1, preferably from 0.01:1 to 0.08:1, more preferably from 0.02:1 to 0.06:1.

25. The process of any of embodiments 1 to 24, wherein in the aqueous synthesis mixture in (ii.1), the molar ratio of $H_2O$ relative to Si, calculated as $SiO_2$ and contained in the zeolitic material having a molar ratio $B_2O_3:SiO_2$ of at most 0.02:1, is in the range of from 8:1 to 20:1, preferably from 10:1 to 18:1, more preferably from 12:1 to 16:1.

26. The process of any of embodiments 1 to 25, wherein in the aqueous synthesis mixture in (ii.1), the molar ratio of the MWW template compound relative to Si, calculated as $SiO_2$ and contained in the zeolitic material provided in (i), is in the range of from 0.5:1 to 1.7:1, preferably from 0.8:1 to 1.5:1, more preferably from 1.0:1 to 1.3:1.

27. The process of any of embodiments 1 to 26, wherein in (ii.2), the hydrothermal synthesizing is carried out at a temperature in the range of from 80 to 250° C., preferably from 120 to 200° C., more preferably from 160 to 180° C.

28. The process of any of embodiments 1 to 27, wherein in (ii.2), the hydrothermal synthesizing is carried out for a period in the range of from 10 to 100 h, more preferably from 20 to 80 h, more preferably from 40 to 60 h.

29. The process of any of embodiments 1 to 28, wherein in (ii.2), the hydrothermal synthesizing is carried out in a closed system under autogenous pressure.

30. The process of any of embodiments 1 to 29, wherein neither during (ii.2), nor after (ii.2) and before (iii), the titanium-containing zeolitic material having an MWW framework structure is separated from its mother liquor.

31. The process of any of embodiments 1 to 30, wherein the mother liquor subjected to (iii) comprising the titanium-containing zeolitic material having an MWW framework structure has a solids content, optionally after concentration or dilution, in the range of from 5 to 25 weight-%, more preferably from 10 to 20 weight-%, based on the total weight of the mother liquor comprising the titanium-containing zeolitic material.

32. The process of any of embodiments 1 to 31, wherein during spray-drying in (iii), the drying gas inlet temperature is in the range of from 200 to 700° C., preferably from 200 to 350° C., and the drying gas outlet temperature is in the range of from 70 to 190° C.

33. The process of any of embodiments 1 to 32, wherein the zeolitic material having an MWW framework structure obtained from (iii) has a Si content in the range of from 30 to 40 weight-%, calculated as elemental Si, a total organic carbon content (TOC) in the range of from 0 to 14 weight-%, and a Ti content of from 2.1 to 2.8 weight-%, calculated as elemental titanium, in each case based on the total weight of the zeolitic material.

34. The process of any of embodiments 1 to 33, wherein in (iii), the zeolitic material having an MWW framework structure is obtained in the form of particles having a Dv10 value in the range of from 1 to 10 micrometer, preferably from 3 to 10 micrometer, more preferably from 4 to 6 micrometer, a Dv50 value in the range of from 5 to 50 micrometer, preferably from 7 to 50 micrometer, more preferably from 8 to 30 micrometer and a Dv90 value in the range of from 12 to 200 micrometer, preferably from 12 to 90 micrometer, more preferably from 13 to 70 micrometer.

35. The process of any of embodiments 1 to 34, further comprising
(iv) treating the titanium-containing zeolitic material having an MWW framework structure obtained from (iii) with an aqueous solution having a pH of at most 5.

36. The process of embodiment 35, wherein after (iii) and before (iv), the spray-dried titanium-containing zeolitic material having an MWW framework structure obtained from (iii) is not subjected to calcination.

37. The process of embodiment 35 or 36, wherein in (iv), the weight ratio of the aqueous solution relative to the titanium-containing zeolitic material having an MWW framework structure is in the range of from 10:1 to 30:1, preferably from 15:1 to 25:1, more preferably from 18:1 to 22:1.

38. The process of any of embodiments 35 to 37, wherein in (iv), the aqueous solution comprises an inorganic acid, preferably selected from the group consisting of phosphoric acid, sulphuric acid, hydrochloric acid, nitric acid, and a mixture of two or more thereof, the aqueous solution preferably comprising nitric acid.

39. The process of any of embodiments 35 to 38, wherein in (iv), the aqueous solution has a pH in the range of from 0 to 5, preferably from 0 to 3, more preferably from 0 to 2.

40. The process of any of embodiments 35 to 39, wherein in (iv), the titanium-containing zeolitic material having an MWW framework structure is treated with the aqueous solution at a temperature in the range of from 50 to 175° C., preferably from 70 to 125° C., more preferably from 95 to 105° C.

41. The process of any of embodiments 35 to 40, wherein in (iv), the titanium-containing zeolitic material having an MWW framework structure is treated with the aqueous solution for a period in the range of from 0.1 to 6 h, preferably from 0.3 to 2 h, more preferably from 0.5 to 1.5 h.

42. The process of any of embodiments 35 to 41, wherein the treating according to (iv) is carried out in a closed system under autogenous pressure.

43. The process of any of embodiments 35 to 42, further comprising
    (v) separating the titanium-containing zeolitic material having an MWW framework structure obtained from (iv) from the aqueous solution, optionally followed by washing the separated titanium-containing zeolitic material having an MWW framework.
44. The process of embodiment 43, wherein (v) comprises drying the separated and optionally washed titanium-containing zeolitic material having an MWW framework structure.
45. The process of any of embodiments 35 to 44, further comprising
    (vi) preparing a suspension, preferably an aqueous suspension containing the titanium-containing zeolitic material having an MWW framework structure obtained from (iv), preferably from (v), said suspension having a solids content preferably in the range of from 5 to 25 weight-%, more preferably from 10 to 20 weight-%, based on the total weight of the suspension, and subjecting the suspension to spray-drying.
46. The process of embodiment 45, wherein during spray-drying, the drying gas inlet temperature is in the range of 200 to 700° C., preferably from 200 to 330° C., and the drying gas outlet temperature is in the range of from 100 to 180° C., preferably from 120 to 180° C.
47. The process of any of embodiments 35 to 46, further comprising
    (vii) calcining the titanium containing zeolitic material having an MWW framework structure obtained from (iv), preferably from (v), more preferably from (vi), wherein the calcining is preferably carried out at a temperature in the range of from 400 to 800° C., more preferably from 600 to 700° C.
48. The process of embodiment 47, wherein in (vii), the calcining is carried out in continuous mode, preferably with a rate of more than 0.2 kg zeolitic material per hour, more preferably in the range of from 0.2 to 2.0 kg zeolitic material per hour, more preferably from 0.5 to 1.5 kg zeolitic material per hour.
49. The process of any of embodiments 1 to 48, further comprising
    (viii) shaping the titanium containing zeolitic material having an MWW framework structure obtained from obtained in (iv) or (v) or (vi) or (vii), preferably in (vii), optionally after suitable modification, preferably after incorporation of at least one heteroatom, obtaining a molding;
    (ix) optionally drying and/or calcining the molding obtained in (viii);
    (x) optionally subjecting the molding obtained in (viii) or (ix), preferably in (ix), to a water-treatment, wherein the water-treatment comprises treating the molding with liquid water in an autoclave under autogenous pressure at a temperature in the range of from 100 to 200° C.;
    (xi) optionally drying and/or calcining the water-treated molding,
50. A spray powder comprising a titanium-containing zeolitic material having an MWW framework structure, wherein at least 99 weight-% of the framework structure consist of titanium, silicon, and oxygen, and wherein at least 99 weight-% of the spray powder consist of the titanium-containing zeolitic material having an MWW framework structure, wherein the lattice parameter c of the titanium-containing zeolitic material having an MWW framework structure is (25.2±0.2) Angstrom, as determined via XRD, and wherein the UV/VIS spectrum of the titanium-containing zeolitic material having an MWW framework structure has a band with a maximum in the range of from 200 to 220 nm, and has no band with a maximum in the range of at least 250 nm.
51. The spray powder of embodiment 50, wherein the crystallinity of the titanium-containing zeolitic material having an MWW framework structure, as determined via XRD, is at least (77±5) %, preferably at least (80±5) %, more preferably at least (82±5) %.
52. The spray powder of embodiment 50 or 51, having a Ti content, calculated as elemental Ti, in the range of from 1.5 to 2.0 weight-%, preferably from 1.8 to 2.0 weight-%, and a Si content, calculated as elemental Si, in the range of from 44 to 48 weight-%, preferably from 44 to 46 weight-%, in each case based on the total weight of the spray powder.
53. The spray powder of any of embodiments 50 to 52, having a total organic carbon content (TOC) of at most 0.1 weight-%, based on the total weight of the spray powder.
54. The spray powder of any of embodiments 50 to 53, having a boron content, calculated as elemental boron, of at most 0.1 weight-%, based on the total weight of the spray powder.
55. The spray powder of any of embodiments 50 to 54, wherein the particles of the spray powder have a Dv10 value in the range of from 1 to 10 micrometer, preferably from 3 to 10 micrometer, more preferably from 4 to 6 micrometer, a Dv50 value in the range of from 5 to 50 micrometer, preferably from 7 to 50 micrometer, more preferably from 8 to 30 micrometer and a Dv90 value in the range of from 12 to 200 micrometer, preferably from 12 to 90 micrometer, more preferably from 13 to 70 micrometer.
56. The spray powder of any of embodiments 50 to 55, comprising mesopores having an average pore diameter (4V/A) in the range of from 10 to 50 nm, preferably from 15 to 45 nm, as determined by Hg porosimetry according to DIN 66133, and comprising macropores having an average pore diameter (4V/A) in the range of from more than 50 nanometer preferably in the range of from 0.06 to 3 micrometer, as determined by Hg porosimetry according to DIN 66133.
57. The spray powder of any of embodiments 50 to 56, obtainable or obtained by a process according to any of embodiments 1 to 48, or a spray powder obtainable or obtained by a process according to any of embodiments 1 to 48.
58. The spray powder of any of embodiments 50 to 57, comprised in a molding, said molding optionally comprising at least binder, preferably a silica binder.
59. A molding comprising the spray powder according to any of embodiments 50 to 58, the molding optionally comprising at least one binder, preferably a silica binder.
60. Use of the spray powder according to any of embodiments 50 to 59 or the molding according to embodiment 59 as a catalyst, as a catalyst support, or as a catalyst precursor.
61. The use of embodiment 60, wherein the spray powder or the molding is used as a catalyst for the epoxidation of an olefin, wherein at least one precious metal is optionally contained in or supported on the spray powder or the molding.
62. The use of embodiment 60, wherein the spray powder or the molding, preferably the spray powder, is used as a catalyst precursor in a process for the process for the preparation of a catalyst, wherein the process for the preparation of a catalyst comprises impregnating the spray powder with at least one zinc containing compound and optionally forming the impregnated spray powder to a molding, optionally containing at least one binder, preferably a silica binder.

63. A method of using the spray powder according to any of embodiments 50 to 59 or the molding according to embodiment 59 as a catalyst, as a catalyst support, or as a catalyst precursor.
64. The method of embodiment 63, wherein the spray powder or the molding is used as a catalyst for the epoxidation of an olefin, wherein at least one precious metal is optionally contained in or supported on the spray powder or the molding.
65. The method of embodiment 63, wherein the spray powder or the molding is used as a catalyst precursor in a process for the process for the preparation of a catalyst, wherein the process for the preparation of a catalyst comprises impregnating the spray powder with at least one zinc containing compound and optionally forming the impregnated spray powder to a molding, optionally containing at least one binder, preferably a silica binder.

The present invention is further illustrated by the following Examples and Comparative Examples.

EXAMPLES

Reference Example 1: Determination of Dv10, Dv50 and Dv90 Values

1. Sample Preparation
    1.0 g of the micropowder is suspended in 100 g deionized water and stirred for 1 min.
2. Apparatus and respective parameters used
    Mastersizer S long bed version 2.15, ser. No. 33544-325; supplier: Malvern Instruments GmbH, Herrenberg, Germany
    focal width: 300RF mm
    beam length: 10.00 mm
    module: MS17
    shadowing: 16.9%
    dispersion model: 3$$D
    analysis model: polydisperse
    correction: none Reference Example 2: PO Test In the PO test, the spray powder containing titanium-containing zeolitic materials having an MWW framework structure of the present invention are tested as catalysts in a glass autoclave by reaction of propene with an aqueous hydrogen peroxide solution (30 weight-%) to yield propylene oxide. In particular, 0.5 g of the spray powder containing the titanium-containing zeolitic material having an MWW framework structure are introduced together with 45 mL of methanol in a glass autoclave, which is cooled to −25° C. 20 mL of liquid propene are pressed into the glass autoclave and the glass autoclave is heated to 0° C. At this temperature, 18 g of an aqueous hydrogen peroxide solution (30 weight-% in water) are introduced into the glass autoclave. After a reaction time of 5 h at 0° C., the mixture was heated to room temperature and the liquid phase was analyzed by gas chromatography with respect to its propylene oxide content.

The propylene oxide content of the liquid phase (in weight-%) is the result of the PO test.

Reference Example 3: Determination of the Crystallinity and the Lattice Parameters The crystallinity and the lattice parameters of the zeolitic materials according to the present invention were determined by XRD analysis. The data are collected using a standard Bragg-Brentano diffractometer with a Cu-X-ray source and an energy dispersive point detector. The angular range of 2° to 70° (2 theta) is scanned with a step size of 0.02°, while the variable divergence slit is set to a constant illuminated sample length of 20 mm. The data are then analyzed using TOPAS V4 software, wherein the sharp diffraction peaks are modeled using a Pawley fit containing a unit cell with the following starting parameters: a=14.4 Angstrom and c=25.2 Angstrom in the space group P6/mmm. These are refined to fit the data. Independent peaks are inserted at the following positions. 8.4°, 22.4°, 28.2° and 43°. These are used to describe the amorphous content. The crystalline content describes the intensity of the crystalline signal to the total scattered intensity. Included in the model are a linear background, Lorentz and polarization corrections, lattice parameters, space group and crystallite size.

Reference Example 4: Determination of the Filtration Resistance of a Suspension and of the Washing Resistance of a Filter Cake The filtration resistance R(F) of a given suspension was determined according to the formula:

$$R(F)=[2*t(end)*A*\text{delta } p]/[V(F,end)*H(end)]$$

wherein
t(end)=endpoint of filtration (in s) (time after start of filtration when the fluid level in the filtration device has the same height as the filter cake)
A=filter area (in m$^2$)
delta p=filtration pressure (in Pa) (pressure difference over the filter cake)
V(F,end)=volume of the filtrate at t(end) (in m$^3$)
H(end)=filter cake height at t(end) (in m)

The washing resistance R(W) of a given filter cake was determined according to the formula:

$$R(W)=[t(end)*A*\text{delta } p]/[V(F,end)*H(end)]$$

wherein
t(end)=endpoint of washing (in s) (time after start of washing when the fluid level of the washing agent in the filtration device has the same height as the filter cake)
A=filter area (in m$^2$)
delta p=filtration pressure (in Pa) (pressure difference over the filter cake)
V(F,end)=volume of the filtrate at t(end) (in m$^3$)
H(end)=filter cake height at t(end) (in m)

Reference Example 5: Determination of Dv10, Dv50, and Dv90 Values of the Mother Liquors 20.4 g of the suspension (mother liquor, pH adjusted) were suspended in 100 ml deionized water and stirred, and 8 ml of the resulting suspension were admixed with 830 ml deionized water. These suspensions were subjected to measurement in the following apparatus with the following parameters.

Mastersizer 2000 version 5.12G (supplier: Malvern Instruments Ltd., Malvern, UK)
measurement range: 0.020 to 2000 micrometer
dispersion module: Hydro 2000G (A)
analysis model: universal
emulation: off Example 1: Preparation of a Titan Containing Zeolitic Material Having an MWW Frame Work Structure (Ti-MWW)

Example 1.1: Preparation of Boron-Containing MWW (B-MWW)

a) Hydrothermal Synthesis 480 kg de-ionized water were provided in a vessel. Under stirring at 70 rpm (rounds per minute), 166 kg boric acid were suspended in the water. The suspension was stirred for another 3 h. Subsequently, 278 kg piperidine were added, and the mixture was stirred for another hour. To the resulting solution, 400 kg Ludox® AS-40 were added, and the resulting mixture was stirred at 70 rpm for another hour.

In this synthesis mixture, the boron source boric acid, calculated as elemental boron, relative to the silicon source Ludox® AS-40, calculated as elemental silicon, was present in a molar ratio of 1:1; the water relative to the silicon source Ludox® AS-40, calculated as elemental silicon, was present in a molar ratio of 10:1; and the template compound piperidine relative to the silicon source Ludox® AS-40, calculated as elemental silicon, was present in a molar ratio of 1.2:1.

The finally obtained mixture was transferred to a crystallization vessel and heated to 175° C. within 5 h under autogenous pressure and under stirring (50 rpm). The temperature of 175° C. was kept essentially constant for 60 h; during these 60 h, the mixture was stirred at 50 rpm. Subsequently, the mixture was cooled to a temperature of from 50-60° C. within 5 h.

The mother liquor containing the crystallized B-MWW precursor had a pH of 11.3 as determined via measurement with a pH electrode.

b) pH Adjustment

To the mother liquor obtained in a), 1400 kg of a 10 weight-% $HNO_3$ aqueous solution were added under stirring at 50 r.p.m. (rounds per minute). The adding was carried out at a temperature of the suspension of 40° C.

After the addition of the 10 weight-% $HNO_3$ aqueous solution, the resulting suspension was further stirred for 5 h under stirring at 50 r.p.m. at a temperature of the suspension of 40° C.

The pH of the thus pH-adjusted mother liquor as determined via measurement with a pH electrode was 7.

The Dv10 value of the particles contained in the pH-adjusted mother liquor, as determined as described in Reference Example 5 hereinabove, was 3.0 micrometer, the respective Dv50 value was 4.9 micrometer, and the respective Dv90 value was 8.1 micrometer.

c) Separation

From the pH-adjusted mother liquor obtained in b), the B-MWW precursor was separated by filtration using different types of filtration devices (suction filter with filter material Sefar Tetex® Mono 24-1100-SK 012, centrifugal filter, candle filter). For all filtration devices, the filtration resistance of the pH-adjusted mother liquor obtained in b) was (30±/−10) mPa*s/m² as determined as described in Reference Example 4 hereinabove.

The filter cake was then washed with de-ionized water until the washing water had a conductivity of less than 200 microSiemens/cm.

The washing resistance of the pH-adjusted mother liquor obtained in b) was (30±/−10) mPa*s/m² as determined as described in Reference Example 4 hereinabove.

d) Spray-Drying and Calcination

From the washed filter cake obtained according to c, an aqueous suspension was prepared having a solids content of 15 weight-%. The suspension was subjected to spray-drying in a spray-tower with the following spray-drying conditions:
drying gas, nozzle gas: technical nitrogen
temperature drying gas:
  temperature spray tower (in): 270-340° C.
  temperature spray tower (out): 150-167° C.
  temperature filter (in): 140-160° C.
  temperature scrubber (in): 50-60° C.
  temperature scrubber (out): 34-36° C.
pressure difference filter: 8.3-10.3 mbar
nozzle:
  two-component nozzle supplier Gerig; size 0
  nozzle gas temperature: room temperature
  nozzle gas pressure: 2.5 bar
operation mode: nitrogen straight
apparatus used: spray tower with one nozzle
configuration: spray tower-filter-scrubber
gas flow: 1900 kg/h
filter material: Nomex® needle-felt 20 m²
dosage via flexible tube pump: SP VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried material was then subjected to calcination at 650° C. in a rotary calciner with a throughput in the range of from 0.8 to 1.0 kg/h.

Characterization

The obtained zeolitic material (B-MWW) had a boron content of 1.3 weight-%, a silicon content of 45 weight-%, a total organic carbon (TOC) content of <0.1 weight-% and a crystallinity of 82%, determined by XRD. The BET specific surface area determined via nitrogen adsorption at 77 K according to DIN 66131 was 463 m²/g, the pore volume determined according to Hg porosimetry according to DIN 66133 was 5.2 mL/g, the particle size distribution was characterized by a Dv10 of 5.7 micrometer, a Dv50 of 10.56 micrometer, and a Dv90 of 18.8 micrometer.

Example 1.2 Preparation of Deboronated Zeolitic Material Having an MWW Framework Structure a) Deboronation 1485 kg water were passed into a vessel equipped with a reflux condenser. Under stirring at 40 r.p.m., 99 kg of the spray-dried material obtained according to Example 1.1 were suspended into the water. Subsequently, the vessel was closed and the reflux condenser put into operation. The stirring rate was increased to 70 r.p.m. Under stirring at 70 r.p.m., the content of the vessel was heated to 100° C. within 10 h and kept at this temperature for 10 h. Then, the content of the vessel was cooled to a temperature of less than 50° C.

The resulting deboronated zeolitic material having an MWW framework structure was separated from the suspension by filtration under a nitrogen pressure of 2.5 bar and washed four times with deionized water. After the filtration, the filter cake was dried in a nitrogen stream for 6 h.

The obtained deboronated zeolitic material having an MWW framework structure had a residual moisture content of 80%, as determined using an IR (infrared) scale at 160° C.

b) Spray-Drying

From the nitrogen-dried filter cake having a residual moisture content of 79% obtained according to section c) above, an aqueous suspension was prepared with deionized water, the suspension having a solid content of 15 weight-%. This suspension was subjected to spray-drying in a spray-tower with the following spray-drying conditions:

drying gas, nozzle gas: technical nitrogen
temperature drying gas:
temperature spray tower (in): 290-310° C.
temperature spray tower (out): 140-160° C.
temperature filter (in): 140-160° C.
temperature scrubber (in): 40-60° C.
temperature scrubber (out): 20-40° C.
pressure difference filter: 6.0-10.0 mbar
nozzle:
two-component nozzle: supplier Niro, diameter 4 mm
nozzle gas pressure: 2.5 bar
operation mode: nitrogen straight
apparatus used: spray tower with one nozzle
configuration: spray tower-filter-scrubber
gas flow: 1900 kg/h
filter material: Nomex® needle-felt 20 m²
dosage via flexible tube pump: VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged.

The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

Characterization

The obtained spray-dried zeolitic material having an MWW framework structure had a boron content of 0.08 weight-%, a silicon content of 45 weight-%, a total organic carbon (TOC) content of <0.1 weight-%, and a crystallinity of 79%, determined a by XRD. The BET specific surface area determined via nitrogen adsorption at 77 K according to DIN 66131 was 451 m²/g, the pore volume determined according to Hg porosimetry according to DIN 66133 was 4.99 mL/g. The particle size distribution was characterized by a Dv10 of 5.6 micrometer, a Dv50 of 11.1 micrometer, and a Dv90 of 24.1 micrometer.

Example 1.3 Preparation of a Titanium Containing Zeolitic Material Having an MWW Framework Structure a) Hydrothermal Synthesis Based on the zeolitic material having an MWW framework structure as obtained according to Example 1.2, a titanium zeolitic material having an MWW framework structure was prepared.

Starting materials: deionized water: 263 kg
piperidine: 97 kg
tetrabutylorthotitanate: 13.8 kg
zeolitic material
obtained according to 1.2: 64 kg 64 kg of the zeolitic material having an MWW framework structure were transferred in to a first vessel A.

In a second vessel B, 150 kg deionized water were transferred and stirred at 80 r.p.m. 97 kg piperidine were added under stirring, and during addition, the temperature of the mixture increased for about 15° C. Subsequently, 12.8 kg tetrabutylorthotitanate and 23 kg deionized water were added. Stirring was then continued for 60 min.

The mixture of vessel B was then transferred into vessel A, and stirring in vessel A was started (70 r.p.m.). 90.00 kg deionized water were filled into vessel A and transferred to vessel B.

After said stirring at 70 r.p.m., the frequency was decreased to 50 r.p.m., and the mixture in vessel B was heated to a temperature of 170° C. within 5 h. At a constant stirring rate of 50 r.p.m., the temperature of the mixture in vessel B was kept at an essentially constant temperature of 170° C. for 48 h under autogenous pressure. During this crystallization of titanium-containing zeolitic material having an MWW framework structure, a pressure increase of up to 10 bar was observed. Subsequently, the obtained suspension containing the titanium-containing zeolitic material having an MWW framework structure was cooled within 5 h.

b) Spray-Drying

The obtained suspension was diluted with water to have a concentration of water of 85 weight-% and directly subjected to spray-drying in a spray-tower with the following spray-drying conditions:

drying gas, nozzle gas: technical nitrogen
temperature drying gas:
temperature spray tower (in): 290-310° C.
temperature spray tower (out): 150-170° C.
temperature filter (in): 150-170° C.
temperature scrubber (in): 30-50° C.
temperature scrubber (out): 30-50° C.
pressure difference filter: 6.0-10.0 mbar
nozzle:
two-component nozzle: supplier Niro, diameter 4 mm
nozzle gas pressure: 1.5 bar
operation mode: nitrogen straight
apparatus used: spray tower with one nozzle
configuration: spray tower-filter-scrubber
gas flow: 1800 kg/h
filter material: Nomex® needle-felt 20 m²
dosage via flexible tube pump: SP VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

Characterization

The spray-dried titanium-containing zeolitic material having an MWW framework structure had a silicon content of 36 weight-%, a titanium content of 2.4 weight-%, a total organic carbon (TOC) content of 11 weight-%, a nitrogen content of 2.3 weight-%, and a crystallinity of 79%, determined by XRD. The particle size distribution was characterized by a Dv10 of 5.3 micrometer, a Dv50 of 11.8 micrometer, and Dv90 of 44.0 micrometer.

Example 1.4 Acid Treatment of the Titanium Containing Zeolitic Material Having an MWW Framework The spray-dried titanium-containing zeolitic material having an MWW framework structure as obtained in Example 1.3 was subjected to acid treatment as described in the following a) Acid Treatment
Starting materials: deionized water: 1233 kg
nitric acid
(10% aqueous solution) 287 kg
spray-dried Ti-MWW
obtained according to 1.3: 76 kg 1233 kg deionized water were filled in a vessel. 287 kg nitric acid were added, and 76 kg of the spray-dried titanium-containing zeolitic material having an MWW framework structure were added under stirring at 50 r.p.m. The resulting mixture was stirred for another 15 min. Subsequently, the stirring rate was increased to 70 r.p.m.

The mixture in the vessel was heated to 100° C. and kept at this temperature and under autogenous pressure for 1 h under stirring. The thus obtained mixture was then cooled within 1 h to a temperature of less than 50° C.

b) Separation
The cooled mixture was subjected to filtration, and the filter cake was washed six times with deionized water under a nitrogen pressure of 2.5 bar.

c) Spray-Drying
From the filter cake obtained from b), an aqueous suspension was prepared with deionized water, the suspension having a solid content of 85 weight-%. This suspension was subjected to spray-drying in a spray-tower with the following spray-drying conditions:
drying gas, nozzle gas: technical nitrogen
temperature drying gas:
temperature spray tower (in): 200-330° C.
temperature spray tower (out): 140-165° C.
temperature filter (in): 140-160° C.
temperature scrubber (in): 50-60° C.
temperature scrubber (out): 20-40° C.
pressure difference filter: 7.0-11.0 mbar
nozzle:
two-component nozzle: supplier Niro, diameter 4 mm
nozzle gas throughput: 23 kg/h
nozzle gas pressure: 2.5 bar
operation mode: nitrogen straight
apparatus used: spray tower with one nozzle
configuration: spray tower-filter-scrubber
gas flow: 1900 kg/h
filter material: Nomex® needle-felt 20 m$^2$
dosage via flexible tube pump: S VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

Characterization

The spray-dried acid-treated titanium-containing zeolitic material having an MWW framework structure material had a silicon content of 40 weight-%, a titanium content of 1.6 weight-%, and a total organic carbon (TOC) content of 2.0 weight-%.

d) Calcination

The spray-dried material was then subjected to calcination at 650° C. in a rotary calciner with a throughput of 0.8-1.0 kg/h.

Characterization

The calcined material had a silicon content of 44 weight-%, a titanium content of 1.8 weight-% and a total organic carbon (TOC) content of less than 0.1 weight-%. The lattice parameter c of the framework structure has a value of 25.2±0.2 Angstrom, as determined via XRD. The UV/VIS spectrum showed a band with a maximum in the range of from 200 to 215 nm, wherein the UV/VIS spectrum showed no band with a maximum in the range of above 250 nm. The respective XRD pattern and UV/VIS spectrum are shown in FIGS. 1 and 2. The Langmuir surface are determined via nitrogen adsorption at 77 K according to DIN 66131 was 634 m$^2$/g, the multipoint BET specific surface area determined via nitrogen adsorption at 77 K according t DIN 66131 was 458 m$^2$/g. The degree of crystallization determined via XRD was 84%, the average crystallite size 30.5 nm. The particle size distribution was characterized by a Dv10 of 4.5 micrometer, a Dv50 of 8.5 micrometer, and Dv90 of 14.6 micrometer.

Example 2: Preparation of a Titanium Containing Zeolitic Material Having an MWW Framework Structure Example 2.1 Preparation of Boron Containing Zeolitic Material Having an MWW Frame-Work Structure (B-MWW)

a) Hydrothermal Synthesis 480 kg de-ionized water were provided in a vessel. Under stirring at 70 rpm (rounds per minute), 166 kg boric acid were suspended in the water. The suspension was stirred for another 3 h. Subsequently, 278 kg piperidine were added, and the mixture was stirred for another hour. To the resulting solution, 400 kg Ludox® AS-40 were added, and the resulting mixture was stirred at 70 rpm for another hour.

The finally obtained mixture was transferred to a crystallization vessel and heated to 170° C. within 5 h under autogenous pressure and under stirring (50 rpm). The temperature of 170° C. was kept essentially constant for 120 h; during these 120 h, the mixture was stirred at 50 rpm.

Subsequently, the mixture was cooled to a temperature of from 50 to 60° C. within 5 h. The aqueous suspension containing B-MWW had a pH of 11.3 as determined via measurement with a pH electrode.

b) Separation

From said suspension, the B-MWW precursor was separated by filtration. The filter cake was then washed with de-ionized water until the washing water had a conductivity of less than 700 microSiemens/cm c) Spray-drying The thus obtained filter cake was subjected to spray-drying in a spray-tower with the following spray-drying conditions:

drying gas, nozzle gas: technical nitrogen
temperature drying gas:
temperature spray tower (in): 235° C.
temperature spray tower (out): 140° C.
nozzle:
two-component nozzle supplier Gerig; size 0
nozzle gas temperature: room temperature
nozzle gas pressure: 1.0 bar
operation mode: nitrogen straight
apparatus used: spray tower with one nozzle
configuration: spray tower-filter-scrubber
gas flow: 1500 kg/h
filter material: Nomex® needle-felt 20 m²
dosage via flexible tube pump: SP VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

d) Calcination

The spray-dried material was then subjected to calcination at 600° C. for 10 h.

Characterization

The obtained B-MWW had a boron content of 1.9 wt. %, a silicon content of 41 wt. %, a total organic carbon (TOC) content of <0.1 wt. % and a crystallinity of 74%, determined by XRD. The BET specific surface area determined via nitrogen adsorption at 77 K according to DIN 66131 was 448 m²/g, the pore volume determined according to Hg porosimetry according to DIN 66133 was 5.9 mL/g. The particle size distribution was characterized by a Dv10 of 6.5 micrometer, a Dv50 of 26.9 micrometer, and Dv90 of 82.2 micrometer.

Example 2.2 Preparation of Deboronated Zeolitic Material Having an MWW Framework Structure a) Deboronation 9 kg water were passed into a vessel equipped with a reflux condenser. Under stirring at 40 r.p.m., 0.6 kg of the spray-dried material obtained according to Example 2.1 were suspended into the water. Subsequently, the vessel was closed and the reflux condenser put into operation. The stirring rate was increased to 250 r.p.m. Under stirring at 250 r.p.m., the content of the vessel was heated to 100° C. within 10 h and kept at this temperature for 10 h. Then, the content of the vessel was cooled to a temperature of less than 50° C.

The resulting deboronated zeolitic material having an MWW framework structure was separated from the suspension by filtration and washed with 8 L deionized water. After the filtration, the filter cake was dried in an oven at 120° C. for 16 h.

Characterization

The dried obtained zeolitic material having an MWW framework structure had a boron content of 0.07 weight-%, a silicon content of 40 weight-%, and a total organic carbon (TOC) content of less than 0.1 weight-%, and a crystallinity of 81%, determined by XRD. The BET specific surface area determined via nitrogen adsorption at 77 K according to DIN 66131 was 476 m²/g. The particle size distribution was characterized by a Dv10 of 6.3 micrometer, a Dv50 was 38.3 of, and a Dv90 of 95.2 micrometer.

Example 2.3 Preparation of the Titanium Containing Zeolitic Material Having an MWW Framework Structure Based on the deboronated zeolitic material having an MWW framework structure as obtained according to Example 2.2, a titanium-containing zeolitic material having an MWW framework structure was prepared.

a) Hydrothermal Synthesis

Starting materials: deionized water: 821 g
piperidine: 300 g
tetrabutylorthotitanate: 40 g
deboronated zeolitic material
obtained according to 2.2: 200 g 500 g of distilled water was filled in a beaker and 300 g piperidine were added and the mixture was stirred for 5 min. Afterwards 40 g of Tetrabutylorthotitanate was added under stirring and the mixture was further stirrer for 30 min before the addition of 321 g of distilled water. After stirring for another 10 min, 200 g of zeolitic material were added under stirring and the suspension was further stirred for another 30 min. The suspension was then transferred to an autoclave and heated in 90 min to 170° C. under stirring (100 rpm) and kept there for 48 h. The pressure increase during the synthesis is 9 bar. Subsequently, the obtained suspension containing the titanium-containing zeolitic material having an MWW framework structure was cooled below 50° C.

c) Spray-Drying

The obtained suspension was diluted with water to have a concentration of water of 85 weight-% directly subjected to spray-drying in a spray-tower with the following spray-drying conditions:

drying gas, nozzle gas: technical nitrogen
temperature drying gas:
temperature spray tower (in): 177° C.
temperature spray tower (out): 125° C.
temperature filter (in): 115° C.
pressure difference filter: 8 mbar
nozzle:
two-component nozzle: 2-fluid nozzle
nozzle gas throughput: 7.7 m³/h
nozzle gas pressure: 2.85 bar
operation mode: co-current flow
apparatus used: spray tower with one nozzle
gas flow: 113 m³/h
filter material: PE with PTFE membrane
dosage via flexible tube pump: 3.3 kg/h (suspension)

The spray tower was comprised of a vertically arranged cylinder having a length of 2,650 mm, a diameter of 1,200 mm, which cylinder was conically narrowed at the bottom.

The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

Characterization

The spray-dried titanium-containing zeolitic material having an MWW framework structure had a silicon content of 36 weight-%, a titanium content of 2.3 weight-%, a total organic carbon (TOC) content of 10.4 weight-%, and an nitrogen content of 2.5 weight-%. The particle size distribution was characterized by a Dv10 of 5.0 micrometer, a Dv50 of 12.68 micrometer, and a Dv90 of 33.4 micrometer.

Example 2.4 Acid Treatment of the Titanium-Containing Zeolitic Material Having an MWW Framework Structure a) Acid Treatment The spray-dried titanium-containing zeolitic material having an MWW framework structure as obtained in Example 2.3 was subjected to acid treatment as described in the following Starting materials: deionized water: 2540 g nitric acid (10% aqueous solution): 460 g zeolitic material obtained from 2.3: 150 g 2540 g deionized water were filled in a vessel. 460 g nitric acid were added, and 150 g of the spray-dried titanium-containing zeolitic material having an MWW framework structure were added under stirring.

The mixture in the vessel was heated to 100° C. and kept at this temperature under autogenous pressure for 1 h under stirring (250 rpm). The thus obtained mixture was then cooled within 1 h to a temperature of less than 50° C.

The cooled mixture was subjected to filtration, and the filter cake was washed with 4 L of water. After the filtration, the filter cake was dried in an oven at 120° C. for 10 h.

b) Calcination

The dried zeolitic material was then subjected to calcination at 650° C. for 5 h.

Characterization

The calcined material had a silicon content of 44 weight-%, a titanium content of 1.9 weight-% and a total organic carbon (TOC) content of less than 0.1 weight-%. The lattice parameter c of the framework structure has a value of 25.2±0.2 Angstrom, as determined via XRD. The UV/VIS showed a band with a maximum in the range of from 200 to 220 nm, wherein the UV/VIS spectrum showed no band with a maximum in the range of above 250 nm. The respective XRD pattern and UV/VIS spectrum are shown in FIGS. 3 and 4. The Langmuir surface are determined via nitrogen adsorption at 77 K according to DIN 66131 was 643 m$^2$/g, the multipoint BET specific surface area determined via nitrogen adsorption at 77 K according to DIN 66131 was 479 m$^2$/g. The degree of crystallization determined via XRD was 82%.

Comparative Example 1: Preparation of a Titanium Containing Zeolitic Material Having an MWW Framework Structure Comparative Example 1.1: Preparation of Boron-Containing Zeolitic Material Having an MWW Framework Structure a) Hydrothermal Synthesis 470.4 kg de-ionized water were provided in a vessel. Under stirring at 70 rpm (rounds per minute), 162.5 kg boric acid were suspended in the water. The suspension was stirred for another 3 h. Subsequently, 272.5 kg piperidine were added, and the mixture was stirred for another hour. To the resulting solution, 392.0 kg Ludox® AS-40 were added, and the resulting mixture was stirred at 70 rpm for another hour.

The finally obtained mixture was transferred to a crystallization vessel and heated to 170° C. within 5 h under autogenous pressure and under stirring (50 rpm). The temperature of 170° C. was kept essentially constant for 120 h; during these 120 h, the mixture was stirred at 50 rpm. Subsequently, the mixture was cooled to a temperature of from 50-60° C. within 5 h. The aqueous suspension containing B-MWW precursor had a pH of 11.3 as determined via measurement with a pH electrode.

b) Separation

From said suspension, the B-MWW precursor was separated by filtration. The filter cake was then washed with de-ionized water until the washing water had a conductivity of less than 700 microSiemens/cm c) Spray-Drying The thus obtained filter cake was subjected to spray-drying in a spray-tower with the following spray-drying conditions:

drying gas, nozzle gas: technical nitrogen
temperature drying gas:
temperature spray tower (in): 288-291° C.
temperature spray tower (out): 157-167° C.
temperature filter (in): 150-160° C.
temperature scrubber (in): 40-48° C.
temperature scrubber (out): 34-36° C.
pressure difference filter: 8.3-10.3 mbar
nozzle:
two-component nozzle supplier Gerig; size 0
nozzle gas temperature: room temperature
nozzle gas pressure: 2.5 bar
operation mode: nitrogen straight
apparatus used: spray tower with one nozzle
configuration: spray tower-filter-scrubber
gas flow: 1,900 kg/h
filter material: Nomex® needle-felt 20 m$^2$
dosage via flexible tube pump: SP VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

d) Calcination

The spray-dried material was then subjected to calcination at 650° C. for 2 h.

Characterization

The calcined material had a boron content of 1.9 weight-%, a silicon content of 41 weight-%, and a total organic carbon (TOC) content of 0.18 weight-%. The particle size distribution was characterized by a Dv10 of 6.5 micrometer, a Dv50 of 26.9 micrometer, and a Dv90 of 82.2 micrometer.

Comparative Example 1.2: Preparation of Deboronated Zeolitic Material Having an MWW Framework Structure a) Deboronation 525 kg water were passed into a vessel equipped with a reflux condenser. Under stirring at 40 r.p.m., 35 kg of the spray-dried material obtained according to Comparative Example 1.1 were suspended into the water. Subsequently, the vessel was closed and the reflux condenser put into operation. The stirring rate was increased to 70 r.p.m. Under stirring at 70 r.p.m., the content of the vessel was heated to 100° C. within 10 h and kept at this temperature for 10 h. Then, the content of the vessel was cooled to a temperature of less than 50° C.

The resulting deboronated zeolitic material having an MWW framework structure was separated from the suspension by filtration under a nitrogen pressure of 2.5 bar and washed four times with deionized water. After the filtration, the filter cake was dried in a nitrogen stream for 6 h.

The obtained deboronated zeolitic material having an MWW framework structure had a residual moisture content of 79%, as determined using an IR (infrared) scale at 160° C.

b) Spray-Drying

From the nitrogen-dried filter cake having a residual moisture content of 79% obtained according to section c) above, an aqueous suspension was prepared with deionized water, the suspension having a solid content of 15 weight-%. This suspension was subjected to spray-drying in a spray-tower with the following spray-drying conditions:

drying gas, nozzle gas: technical nitrogen
temperature drying gas:
temperature spray tower (in): 304° C.
temperature spray tower (out): 147-150° C.
temperature filter (in): 133-141° C.
temperature scrubber (in): 106-114° C.
temperature scrubber (out): 13-20° C.
pressure difference filter: 1.3-2.3 mbar
nozzle:
two-component nozzle: supplier Niro, diameter 4 mm
nozzle gas throughput: 23 kg/h
nozzle gas pressure: 2.5 bar
operation mode: nitrogen straight
apparatus used: spray tower with one nozzle
configuration: spray tower-filter-scrubber
gas flow: 550 kg/h
filter material: Nomex® needle-felt 10 m$^2$
dosage via flexible tube pump: VF 10 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged.

The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

Characterization

The spray-dried zeolitic material having an MWW framework structure had a boron content of 0.08 weight-%, a silicon content of 42 weight-%, and a total organic carbon (TOC) content of 0.23 weight-%. The particle size distribution was characterized by a Dv10 of 6.9 micrometer, a Dv50 of 22.1 micrometer, and a Dv90 of 55.2 micrometer.

Comparative Example 1.3 Preparation of a Titanium-Containing Zeolitic Material Having an MWW Framework Structure Based on the deboronated zeolitic material having an MWW framework structure as obtained according to Comparative Example 1.2, a titanium-containing zeolitic material having an MWW framework structure was prepared.

a) Hydrothermal Synthesis

Starting materials: deionized water: 244.00 kg
piperidine: 118.00 kg
tetrabutylorthotitanate: 10.90 kg
deboronated zeolitic material: 54.16 kg 54.16 kg of the deboronated zeolitic material having an MWW framework structure were transferred in to a first vessel A.

In a second vessel B, 200.00 kg deionized water were transferred and stirred at 80 r.p.m. 118.00 kg piperidine were added under stirring, and during addition, the temperature of the mixture increased for about 15° C. Subsequently, 10.90 kg tetrabutylorthotitanate and 20.00 kg deionized water were added. Stirring was then continued for 60 min.

The mixture of vessel B was then transferred into vessel A, and stirring in vessel A was started (70 r.p.m.). 24.00 kg deionized water were filled into vessel A and transferred to vessel B.

The mixture in vessel B was then stirred for 60 min. at 70 r.p.m. At the beginning of the stirring, the pH of the mixture in vessel B was 12.6, as determined with a pH electrode.

After said stirring at 70 r.p.m., the frequency was decreased to 50 r.p.m., and the mixture in vessel B was heated to a temperature of 170° C. within 5 h. At a constant stirring rate of 50 r.p.m., the temperature of the mixture in vessel B was kept at an essentially constant temperature of 170° C. for 120 h under autogenous pressure. During this crystallization of Ti-MWW, a pressure increase of up to 10.6 bar was observed. Subsequently, the obtained suspension having a pH of 12.6 was cooled within 5 h.

The cooled suspension was subjected to filtration, and the separated mother liquor was transferred to waste water discharge. The filter cake was washed four times with deionized water under a nitrogen pressure of 2.5 bar. After the last washing step, the filter cake was dried in a nitrogen stream for 6 h.

b) Spray Drying

From 246 kg of said filter cake, an aqueous suspension was prepared with deionized water, the suspension having a solid content of 15 weight-%. This suspension was subjected to spray-drying in a spray-tower with the following spray-drying conditions:

drying gas, nozzle gas: technical nitrogen
temperature drying gas:
temperature spray tower (in): 304° C.
temperature spray tower (out): 147-152° C.
temperature filter (in): 133-144° C.

temperature scrubber (in): 111-123° C.
temperature scrubber (out): 12-18° C.
pressure difference filter: 1.8-2.8 mbar
nozzle:
two-component nozzle: supplier Niro, diameter 4 mm
nozzle gas throughput: 23 kg/h
nozzle gas pressure: 2.5 bar
operation mode: nitrogen straight
apparatus used: spray tower with one nozzle
configuration: spray tower-filter-scrubber
gas flow: 550 kg/h
filter material: Nomex® needle-felt 10 m²
dosage via flexible tube pump: VF 10 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

Characterization

The spray-dried titanium-containing zeolitic material having an MWW framework structure had a silicon content of 37 weight-%, a titanium content of 2.4 weight-%, and a total organic carbon (TOC) content of 7.5 weight-%. The particle size distribution was characterized by a Dv10 of 6.9 micrometer, a Dv50 of 22.1 micrometer, and a Dv90 of 65.2 micrometer.

Comparative Example 1.4: Acid Treatment of the Titanium-Containing Zeolitic Material Having an MWW Framework Structure The titanium-containing zeolitic material having an MWW framework structure obtained from Comparative Example 1.3 was subjected to acid treatment as described in the following:

a) Acid Treatment
Starting materials: deionized water: 690.0 kg
nitric acid
(53% aqueous solution): 900.0 kg
spray-dried zeolitic material
obtained from 1.3: 53.0 kg 670.0 kg deionized water were filled in a vessel. 900 kg nitric acid were added, and 53.0 kg of the spray-dried titanium-containing zeolitic material having an MWW framework structure were added under stirring at 50 r.p.m. The resulting mixture was stirred for another 15 min. Subsequently, the stirring rate was increased to 70 r.p.m.

Within 1 h, the mixture in the vessel was heated to 100° C. and kept at this temperature and under autogenous pressure for 20 h under stirring. The thus obtained mixture was then cooled within 2 h to a temperature of less than 50° C.

b) Separation

The cooled mixture was subjected to filtration, and he filter cake was washed six times with deionized water under a nitrogen pressure of 2.5 bar. After the last washing step, the filter cake was dried in a nitrogen stream for 10 h. The washing water after the sixth washing step had a pH of about 2.7. 225.8 kg dried filter cake were obtained.

c) Spray-Drying

From the filter cakes obtained from b), an aqueous suspension was prepared with deionized water, the suspension having a solid content of 15 wt.-%. This suspension was subjected to spray-drying in a spray-tower with the following spray-drying conditions:
drying gas, nozzle gas: technical nitrogen
temperature drying gas:
temperature spray tower (in): 304-305° C.
temperature spray tower (out): 151° C.
temperature filter (in): 141-143° C.
temperature scrubber (in): 109-118° C.
temperature scrubber (out): 14-15° C.
pressure difference filter: 1.7-3.8 mbar
nozzle:
two-component nozzle: supplier Niro, diameter 4 mm
nozzle gas throughput: 23 kg/h
nozzle gas pressure: 2.5 bar
operation mode: nitrogen straight
apparatus used: spray tower with one nozzle
configuration: spray tower-filter-scrubber
gas flow: 550 kg/h
filter material: Nomex® needle-felt 10 m²
dosage via flexible tube pump: VF 10 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

Characterization

The spray-dried acid-treated titanium-containing zeolitic material having an MWW framework structure had a silicon content of 42 weight-%, a titanium content of 1.6 weight-%, and a total organic carbon (TOC) content of 1.7 weight-%.

d) Calcination

The spray-dried material was then subjected to calcination at 650° C. in a rotary furnace for 2 h.

Characterization

The calcined zeolitic material had a silicon content of 42.5 weight-%, a titanium content of 1.6 weight-% and a total organic carbon (TOC) content of 0.15 weight-%. The lattice parameter c of the framework structure has a value of 25.5±0.2 Angstrom, as determined via XRD. The UV/VIS showed a first band with a maximum in the range of from 200 to 220 nm, a second band with a maximum in the range of from 250 to 265 nm, and a third band with a maximum in the range of from 320 to 340 nm. The respective XRD pattern and UV/VIS spectrum are shown in FIGS. 5 and 6. The Langmuir surface are determined via nitrogen adsorption at 77 K according to DIN 66131 was 612 m²/g, the multipoint BET specific surface area determined via nitrogen adsorption at 77 K according t DIN 66131 was 442 m²/g. The total intrusion volume determined according to Hg porosimetry according to DIN 66133 was 4.9 ml/g. The degree of crystallization determined via XRD was 80%, the average crystallite size 31 nm. The particle size distribution was characterized by a Dv10 of 7.8 micrometer, a Dv50 of 29.8 micrometer, and a Dv90 of 93.6 micrometer.

Comparison of the Results of Examples 1, 2 and Comparative Example 1

Example 1 and Example 2 are carried out according to the invention, i.e. by a process including providing a boron containing zeolitic material which is subjected to deboronation and subsequently subjected to a hydrothermal incorporation of titanium, wherein the obtained titanium-containing zeolitic material having an MWW framework structure is not separated from the mother liquor prior to spray-drying, but the mother liquor comprising the titanium-containing zeolitic material is directly subjected to spray-drying and the thus obtained spray-dried titanium-containing zeolitic material having an MWW framework structure is further subjected to an acid treatment.

Comparative Example 1 is carried out according to a process including providing a boron containing zeolitic material which is subjected to deboronation and subsequently subjected to a hydrothermal incorporation of titanium, wherein the obtained titanium-containing zeolitic material having an MWW framework structure is separated from the mother liquor prior to spray-drying and the thus obtained spray-dried titanium-containing zeolitic material having an MWW framework structure is further subjected to an acid treatment.

The titanium-containing zeolitic materials having an MWW framework structure obtained from Example 1 and Example 2 according to the invention have a decreased interlayer distance compared to the titanium-containing zeolitic material having an MWW framework structure obtained according to Comparative Example 1. This interlayer distance is expressed by the lattice parameter c of the framework structure which has a value of 25.2±0.2 Angstrom, as determined via XRD, for the titanium-containing zeolitic materials having an MWW framework structure obtained according to the invention and a value of 25.5±0.2 Angstrom for the titanium-containing zeolitic materials having an MWW framework structure, obtained according to Comparative Example 1.

Further, the titanium-containing zeolitic materials having an MWW framework structure, obtained according to the invention have a lower total organic carbon (TOC) content (less than 0.1 weight-%) compared to the titanium-containing zeolitic material having an MWW framework structure obtained according to Comparative Example 1 (0.15 weight-%).

Furthermore, the UV/VIS spectra of the titanium-containing zeolitic materials having an MWW framework structure, obtained according to the invention showed a band with a maximum in the range of from 200 to 220 nm, and no band with a maximum in the range of above 250 nm. In contrast thereto, the UV/VIS spectrum of the titanium-containing zeolitic material obtained according to Comparative Example 1 showed a band with a maximum in the range of from 200 to 220 nm, and in addition a band with a maximum in the range of from 250 to 265 nm, as well as a band with a maximum in the range of from 320 to 340 nm.

Example 3: Test of the Titanium-Containing Zeolitic Material Having an MWW Framework Structure as Catalyst for the Epoxidation of Propene The titanium-containing zeolitic materials having an MWW framework structure as obtained from Example 1, Example 2, and Comparative Example 1 were subjected to the PO test as described in Reference Example 2. The following values were obtained:

Zeolitic material obtained according to Example 1: 11.5 weight-% PO

Zeolitic material obtained according to Example 2: 10.1 weight-% PO

Zeolitic material obtained according to Comparative Example 1: 9.8 weight-% PO

Clearly, these tests show that the titanium-containing zeolitic material having an MWW framework structure according to present invention may serve as a good catalyst for the preparation of propylene oxide from propene in acetonitrile as solvent, using hydrogen peroxide as oxidizing agent and has better properties than the respective zeolitic material prepared according to the teaching of the prior art.

CITED LITERATURE

EP 1 485 321 A1
WO 02/28774 A2
Chemistry of Materials 24 (2012), pages 4371-4374 a

The invention claimed is:

1. A process for preparing a titanium-comprising zeolitic material having an MWW framework structure comprising
   (i) providing a zeolitic material having an MWW framework structure comprising $SiO_2$ and $B_2O_3$, wherein a molar ratio $B_2O_3:SiO_2$ is at most 0.02:1 and wherein at least 99 weight-% of the MWW framework structure consist of $B_2O_3$ and $SiO_2$;
   (ii) incorporating titanium into the zeolitic material provided in (i) comprising
      (ii.1) preparing an aqueous synthesis mixture comprising the zeolitic material provided in (i), an MWW template compound and a titanium source, wherein a molar ratio of the MWW template compound relative to Si, calculated as $SiO_2$ and comprised in the zeolitic material provided in (i), is in a range of from 0.5:1 to 1.4:1;
      (ii.2) hydrothermally synthesizing a titanium-comprising zeolitic material having an MWW framework structure from the aqueous synthesis mixture prepared in (ii.1), obtaining a mother liquor comprising the titanium-comprising zeolitic material having an MWW framework structure;
   (iii) spray-drying the mother liquor obtained from (ii.2) comprising the titanium-comprising zeolitic material having an MWW framework structure to obtain a spray-dried titanium-comprising zeolitic material having an MWW framework structure.

2. The process of claim 1, wherein in (i), the zeolitic material having an MWW framework structure is provided by a process comprising
   (a) hydrothermally synthesizing a B-MWW precursor comprising $SiO_2$ and $B_2O_3$ with a molar ratio $B_2O_3:SiO_2$ of greater than 0.02:1 from a synthesis mixture comprising a silicon source, a boron source, and an MWW template compound, obtaining the B-MWW precursor in a mother liquor;
   (b) separating the B-MWW precursor from the mother liquor to obtain a separated B-MWW precursor, and calcining the separated B-MWW precursor, obtaining a B-MWW;
   (c) deboronating the B-MWW obtained from (b) by treating the B-MWW with a liquid solvent system obtaining the zeolitic material having an MWW framework structure and a molar ratio $B_2O_3:SiO_2$ of at most 0.02:1, and at least partially separating the zeolitic material from the liquid solvent system.

3. The process of claim 2, wherein (c) comprises drying the zeolitic material having an MWW framework structure and a molar ratio $B_2O_3:SiO_2$ of at most 0.02:1.

4. The process of claim 2, wherein the separated zeolitic material having an MWW framework structure and a molar ratio $B_2O_3:SiO_2$ of at most 0.02:1 obtained from (c) is not subjected to calcination prior to (ii).

5. The process of claim 2, wherein in (c), the zeolitic material having an MWW framework structure and a molar ratio $B_2O_3:SiO_2$ of at most 0.02:1 is obtained in a form of particles having a Dv10 value in a range of from 1 to 10 micrometer, a Dv50 value in a range of from 5 to 50 micrometer, and a Dv90 value in a range of from 12 to 200 micrometer.

6. The process of claim 1, wherein the molar ratio $B_2O_3:SiO_2$ of the zeolitic material having an MWW framework structure provided in (i) is at most 0.01:1, wherein at least 99.5 weight-% of the MWW framework structure consist of $B_2O_3$ and $SiO_2$.

7. The process of claim 1, wherein in (ii.1), the MWW template compound is selected from the group consisting of piperidine, hexamethylene imine, N,N,N,N',N',N'-hexamethyl-1,5-pentanediammonium ion, 1,4-bis(N-methylpyrrolidinium)butane, octyltrimethylammonium hydroxide, heptyltrimethylammonium hydroxide, hexyltrimethylammonium hydroxide, and a mixture of two or more thereof, and the titanium source is selected from the group consisting of tetrabutylorthotitanate, tetraisopropylorthotitanate, tetra-ethylorthotitanate, titanium dioxide, titanium tetrachloride, titanium tert-butoxide, and a mixture of two or more thereof.

8. The process of claim 1, wherein in the aqueous synthesis mixture in (ii.1), a molar ratio of Ti, calculated as $TiO_2$ and comprised in the titanium source, relative to Si, calculated as $SiO_2$ and comprised in the zeolitic material having a molar ratio $B_2O_3:SiO_2$ of at most 0.02:1, is in a range of from 0.005:1 to 0.1:1, a molar ratio of $H_2O$ relative to Si, calculated as $SiO_2$ and comprised in the zeolitic material having a molar ratio $B_2O_3:SiO_2$ of at most 0.02:1, is in a range of from 8:1 to 20:1, and a molar ratio of the MWW template compound relative to Si, calculated as $SiO_2$ and comprised in the zeolitic material provided in (i), is in a range of from 0.5:1 to 1.7:1.

9. The process of claim 1, wherein in (ii.2), the hydrothermal synthesizing is carried out at a temperature in a range of from 80 to 250° C., and for a period in a range of from 10 to 100 h.

10. The process of claim 1, wherein neither during (ii.2), nor after (ii.2) and before (iii), the titanium-comprising zeolitic material having an MWW framework structure is separated from the mother liquor.

11. The process of claim 1, wherein the mother liquor subjected to (iii) comprising the titanium-comprising zeolitic material having an MWW framework structure has a solids content in a range of from 5 to 25 weight-% based on a total weight of the mother liquor comprising the titanium-comprising zeolitic material.

12. The process of claim 1, wherein during spray-drying in (iii), a drying gas inlet temperature is in a range of from 200 to 700° C., and a drying gas outlet temperature is in a range of from 70 to 190° C.

13. The process of claim 1, wherein the zeolitic material having an MWW framework structure obtained from (iii) has a Si content in a range of from 30 to 40 weight-%, calculated as elemental Si, a total organic carbon content (TOC) in a range of from 0 to 14 weight-%, and a Ti content of from 2.1 to 2.8 weight-%, calculated as elemental titanium, in each case based on a total weight of the zeolitic material, and wherein in (iii), the zeolitic material having an MWW framework structure is obtained in a form of particles having a Dv10 value in a range of from 1 to 10 micrometer, a Dv50 value in a range of from 5 to 50 micrometer, and a Dv90 value in a range of from 12 to 200 micrometer.

14. The process of claim 1, further comprising
(iv) treating the titanium-comprising zeolitic material having an MWW framework structure obtained from (iii) with an aqueous solution having a pH of at most 5.

15. The process of claim 14, wherein after (iii) and before (iv), the spray-dried titanium-comprising zeolitic material having an MWW framework structure obtained from (iii) is not subjected to calcination.

16. The process of claim 14, wherein in (iv), the aqueous solution has a pH in a range of from 0 to 5.

17. The process of claim 14, wherein in (iv), the titanium-comprising zeolitic material having an MWW framework structure is treated with the aqueous solution at a temperature in a range of from 50 to 175° C.

18. The process of claim 14, further comprising
(v) separating the titanium-comprising zeolitic material having an MWW framework structure obtained from (iv) from the aqueous solution to obtain a separated titanium-comprising zeolitic material having an MWW framework.

19. The process of claim 18, wherein (v) comprises drying the separated titanium-comprising zeolitic material having an MWW framework structure.

20. The process of claim 18, further comprising
(vi) preparing a suspension and subjecting the suspension to spray-drying.

21. The process of claim 20, further comprising
(vii) calcining the titanium-comprising zeolitic material having an MWW framework structure obtained from (iv).

22. The process of claim 21, further comprising
(viii) shaping the titanium-comprising zeolitic material having an MWW framework structure obtained in (iv) or (v) or (vi) or (vii), obtaining a molding;
(ix) drying and/or calcining the molding obtained in (viii);
(x) subjecting the molding obtained in (viii) or (ix), to a water-treatment, wherein the water-treatment comprises treating the molding with liquid water in an autoclave under autogenous pressure at a temperature in a range of from 100 to 200° C. to obtain a water-treated molding;
(xi) drying and/or calcining the water-treated molding.

23. A spray powder obtained by the process according to claim 1.

24. A spray powder, comprising a titanium-comprising zeolitic material having an MWW framework structure, wherein at least 99 weight-% of the framework structure consist of titanium, silicon, and oxygen, and wherein at least 99 weight-% of the spray powder consist of the titanium-comprising zeolitic material having an MWW framework structure, wherein a lattice parameter c of the titanium-comprising zeolitic material having an MWW framework structure is (25.2±0.2) Angstrom, as determined via XRD, and wherein a UV/VIS spectrum of the titanium-comprising zeolitic material having an MWW framework structure has a band with a maximum in a range of from 200 to 220 nm, and has no band with a maximum in a range of at least 250 nm.

25. The spray powder of claim 24, wherein a crystallinity of the titanium-comprising zeolitic material having an MWW framework structure, as determined via XRD, is at least (77±5) %.

26. The spray powder of claim 24, having a Ti content, calculated as elemental Ti, in a range of from 1.5 to 2.0 weight-%, and a Si content, calculated as elemental Si, in a range of from 44 to 48 weight-%, in each case based on a total weight of the spray powder, having a total organic carbon content (TOC) of at most 0.1 weight-%, based on the total weight of the spray powder, and having a boron content, calculated as elemental boron, of at most 0.1 weight-%, based on the total weight of the spray powder.

27. The spray powder of claim 24, wherein particles of the spray powder have a Dv10 value in a range of from 1 to 10 micrometer, a Dv50 value in a range of from 5 to 50 micrometer, and a Dv90 value in a range of from 12 to 200 micrometer, and comprising macropores having an average pore diameter (4V/A) in a range of from more than 50 nanometer, as determined by Hg porosimetry according to DIN 66133.

28. A molding, comprising shaping and, optionally, post-treating, the spray powder of claim 24.

\* \* \* \* \*

UNITED STATES PATENT AND TRADEMARK OFFICE
CERTIFICATE OF CORRECTION

PATENT NO. : 10,029,244 B2
APPLICATION NO. : 14/764354
DATED : July 24, 2018
INVENTOR(S) : Andrei-Nicolae Parvulescu et al.

Page 1 of 1

It is certified that error appears in the above-identified patent and that said Letters Patent is hereby corrected as shown below:

On the Title Page

Column 2, item (57), Line 6, "(ii.I)" should read --(ii.1)--

In the Specification

Column 5, Line 15, "0.52:1" should read --0.52:1.--

Column 7, Line 26, "continuos" should read --continuous--

Column 10, Line 8, "cm" should read --cm.--

Column 18, Line 17, "25 pH" should read --pH--

Column 23, Line 12, "metakaoline" should read --metakaolin--

Column 38, Line 40, "t" should read --to--

Column 46, Line 55, "t" should read --to--

Signed and Sealed this
Twenty-sixth Day of November, 2019

Andrei Iancu
*Director of the United States Patent and Trademark Office*